(12) United States Patent
Conklin et al.

(10) Patent No.: US 8,156,034 B2
(45) Date of Patent: *Apr. 10, 2012

(54) METHOD AND SYSTEM FOR ENHANCED DISTRIBUTION OF FINANCIAL INSTRUMENTS

(75) Inventors: Curt Conklin, Chicago, IL (US); Thomas S. Ricketts, Chicago, IL (US)

(73) Assignee: Incapital Holdings LLC, Chicago, IL (US)

( * ) Notice: Subject to any disclaimer, the term of this patent is extended or adjusted under 35 U.S.C. 154(b) by 568 days.

This patent is subject to a terminal disclaimer.

(21) Appl. No.: 12/290,080

(22) Filed: Oct. 27, 2008

(65) Prior Publication Data

US 2009/0125428 A1 May 14, 2009

Related U.S. Application Data

(63) Continuation of application No. 09/896,760, filed on Jun. 29, 2001, now Pat. No. 7,444,301.

(60) Provisional application No. 60/260,113, filed on Jan. 5, 2001.

(51) Int. Cl.
*G06Q 40/00* (2006.01)
(52) U.S. Cl. ............................ 705/37; 705/39
(58) Field of Classification Search ............... 705/10–44
See application file for complete search history.

(56) References Cited

U.S. PATENT DOCUMENTS

| 5,742,775 | A | 4/1998 | King |
| 5,774,879 | A | 6/1998 | Custy et al. |
| 5,878,403 | A | 3/1999 | DeFrancesco et al. |
| 6,021,397 | A | 2/2000 | Jones et al. |
| 6,064,971 | A | 5/2000 | Hartnett |
| 6,629,082 | B1 * | 9/2003 | Hambrecht et al. ........ 705/36 R |

FOREIGN PATENT DOCUMENTS

| WO | WO 98/06214 | 2/1998 |
| WO | WO 99/52026 | 10/1999 |

OTHER PUBLICATIONS

International Search Report for PCT Application No. PCT/US01/50858, dated Apr. 12, 2002.

* cited by examiner

*Primary Examiner* — Frantzy Poinvil
(74) *Attorney, Agent, or Firm* — Brinks Hofer Gilson & Lione

(57) ABSTRACT

An issuer models financial instruments (e.g., proposed securities) with initial financial parameters to facilitate defining a financial instrument with final financial parameters for actual issuance in the primary offering. The issuer models the initial financial parameter data associated with a corresponding proposed financial instrument based on at least market data relevant to the issuance of the proposed financial instrument. The initial financial parameter data is communicated between an issuer and an underwriter in a posting document via a communications network. The issuer and the underwriter collaborate via electronic communications to determine the final financial parameters of a financial instrument to be issued in the primary offering based on the initial parameter data and an agreement between the issuer and the underwriter.

37 Claims, 9 Drawing Sheets

PRODUCTS AS 11/17/2000  3:25:12 ~120

ISSUER: BANK OF AMERICA ▶   BRAND: INTERNOTES ▶   VIEW: MODELED ▶

~122   ~124

NON-CALLABLE ~126

|   | CREATED BY ~132 | FREQUENCY ~134 | MATURITY ~136 | PURCHASE PRICE ~138 | SPREAD TO TREASURY ~140 | TARGET ~144 COUPON ~142 | SPREAD TO TREASURY ~146 | ACTUAL ~148 COUPON | ALL IN BEY ~150 | FLOATING RATE EQUIV. ~152 |
|---|---|---|---|---|---|---|---|---|---|---|
| 1 ☑ | IC | SEMI-ANNUAL | 2 YEARS | $98.80 | 179 | 7.56% | 179 | 7.56% | 7.60% | -4 |
| 2 ☐ | IC | SEMI-ANNUAL | 10 YEARS | $97.50 | 200 | 7.52% | 200 | 7.52% | 7.56% | 12 |
| 3 ☐ | IC | MONTHLY | AT MATURITY | $96.85 | 150 | 6.54% | 150 | 6.54% | 7.45% | 15 |
| 4 ☐ | IC | QUARTERLY | 3 YEARS | $98.90 | 189 | 6.60% | 189 | 6.60% | 7.00% | 5 |

130

CALLABLE ~128

|   | CREATED BY | FREQUENCY | MATURITY | PURCHASE PRICE | SPREAD TO TREASURY | COUPON | SPREAD TO TREASURY | COUPON | ALL IN BEY | TARGET FLOATING RATE DATE ~153 | TARGET FLOATING RATE DATE ~154 | ADJUSTED TARGET FLOATING RATE (3ML) ~156 | YEARS TO CALL ~158 |
|---|---|---|---|---|---|---|---|---|---|---|---|---|---|
| 5 ☐ | B OF A | QUARTERLY | 3 YEARS | $97.50 | | 6.53% | 145 | 0.00% | 7.65% | 14 | 11/15/2000 | 8 | NC-2 |
| 6 ☐ | B OF A | MONTHLY | AT MATURITY | $99.50 | | 8.21% | 125 | 0.00% | 7.00% | 12 | 11/15/2000 | 7 | NC-3 |

RECALCULATE ~160

VIEW DETAILS    DEACTIVATE    POST

METHOD AND SYSTEM FOR ENHANCED DISTRIBUTION OF FINANCIAL INSTRUMENTS

This application is a continuation of U.S. application Ser. No. 09/896,760, filed Jun. 29, 2001, issued as U.S. Pat. No. 7,444,301 on Oct. 28, 2008, which claims the benefit of provisional application Ser. No. 60/260,113, entitled METHOD AND SYSTEM FOR ENHANCED DISTRIBUTION OF FINANCIAL INSTRUMENTS and filed on Jan. 5, 2001, under 35 U.S.C. §119(e), which applications are incorporated herein in their entirety by this reference.

FIELD OF THE INVENTION

This invention relates to a method and system for distribution of financial instruments, such as securities.

BACKGROUND OF THE INVENTION

An issuer of financial instruments or securities may engage an underwriter to assist in issuing and distributing the financial instruments in a primary offering. A primary offering refers to the issuance of financial instruments or securities from an issuer to a holder via an underwriter or any other member of a distribution chain. The purchasers of the securities in a primary offering have predominantly been institutional investors and accredited investors. Accredited investors may be defined as investors who are sophisticated or meet minimum requirements of income or net worth. As unsophisticated retail investors have flocked to the Internet and other automated trading systems to participate more actively in the financial markets, some underwriters, investment bankers, and broker-dealers seek to tap the potential market of retail customers for initial offerings, particularly in the debt securities area.

However, various obstacles may hinder the ready issuance of securities to retail customers in an initial offering. For example, an individual retail customer may not have sufficient funds to purchase a meaningful amount of financial instruments (e.g., debt securities) that makes it practical for an underwriter or a member of the selling group to deal directly with the retail customer. Further, the retail customer may not be able to comply with a short time window that is customarily used to engage in security transactions associated with a primary offering. Thus, a need exists for a distribution system that facilitates the ready distribution of financial instruments in an initial offering to retail customers.

The issuer may enlist the help of an underwriter in a primary distribution in accordance with various formal or informal practices that are accepted in the financial arena. In the context of a formal practice, the issuer may allow competitive underwriters to make distribution proposals or bids for a proposed primary offering of securities to identify an underwriter that offers the best financial terms to the issuer. In the context of an informal practice, the issuer and underwriter (e.g., bond desk of a broker dealer) may negotiate terms of the issuance of securities via facsimile, e-mail, telephone conversations or in meetings.

Regardless of what technique is used to identify a suitable underwriter with acceptable distribution terms, the issuer of financial instruments or securities in a primary offering may find that compliance with requisite securities filings are time-consuming impediments to raising funds. For example, although a new underwriter may provide better financial terms than a former underwriter of the issuer, the new underwriter may need to take additional steps, such as reviewing periodic reports of the issuer, to effectively discharge its due diligence responsibility with respect to the issuer's disclosure of financial information.

In some circumstances, the issuer and underwriter may negotiate terms of the issuance of securities via facsimile, e-mail, telephone conversations or in meetings that result in protracted time delays in the actual obtaining of the finance associated with the issuance of the securities. The delays in receiving the proceeds from the issuance of the securities may frustrate the business objectives and the smooth operation of the issuer. Moreover, the protracted delays in negotiation may lead to the cancellation of an offering because of changing market conditions or timing which make a securities issuance less desirable than when negotiations between the underwriter and the issuer were initiated. Thus, a need exists for expediting the negotiation process to foster greater cooperation between the issuer and the underwriter.

Another obstacle to coordinating the issuance of financial instruments or securities in a timely manner may be the lack of adequate market information for the issuer to make an informed decision. The underwriter may provide some assistance in this regard, but often market fundamentals are shrouded in mystery and obscured in the manner that makes it difficult for the issuer to determine whether the issuer is properly pricing the offering and offering proper terms that will be well received in the market. Thus, a need exists for providing greater and improved access of market-based information to the issuer for determining what terms of the proposed securities will likely receive market acceptance.

SUMMARY OF THE INVENTION

In accordance with the invention, an issuer models financial instruments (e.g., proposed securities) with initial financial parameters to facilitate defining a financial instrument with final financial parameters for actual issuance in the primary offering. The issuer models the initial financial parameter data associated with a corresponding proposed financial instrument based on at least market data relevant to the issuance of the proposed financial instrument. The initial financial parameter data is communicated between an issuer and an underwriter in a posting document via a communications network. The issuer and the underwriter collaborate via electronic communications to determine the final financial parameters of a financial instrument to be issued in the primary offering based on the initial parameter data and an agreement between the issuer and the underwriter.

In accordance with one aspect of the invention, the issuer may select the final financial parameters of the modeled financial instrument based upon market-based information (e.g., market data and marketing data) to foster successful placement of the securities under estimated prevailing market conditions. In accordance with another aspect of the invention, after the final financial parameters are determined, a regulatory filing may be generated for a filing with a securities regulator for the primary offering of the financial instrument if the financial instrument is a security.

BRIEF DESCRIPTION OF THE DRAWINGS

FIG. 8 shows a presentation for a user interface that relates to the modeling of proposed securities in accordance with the invention.

DETAILED DESCRIPTION OF THE INVENTION

Figure 1:
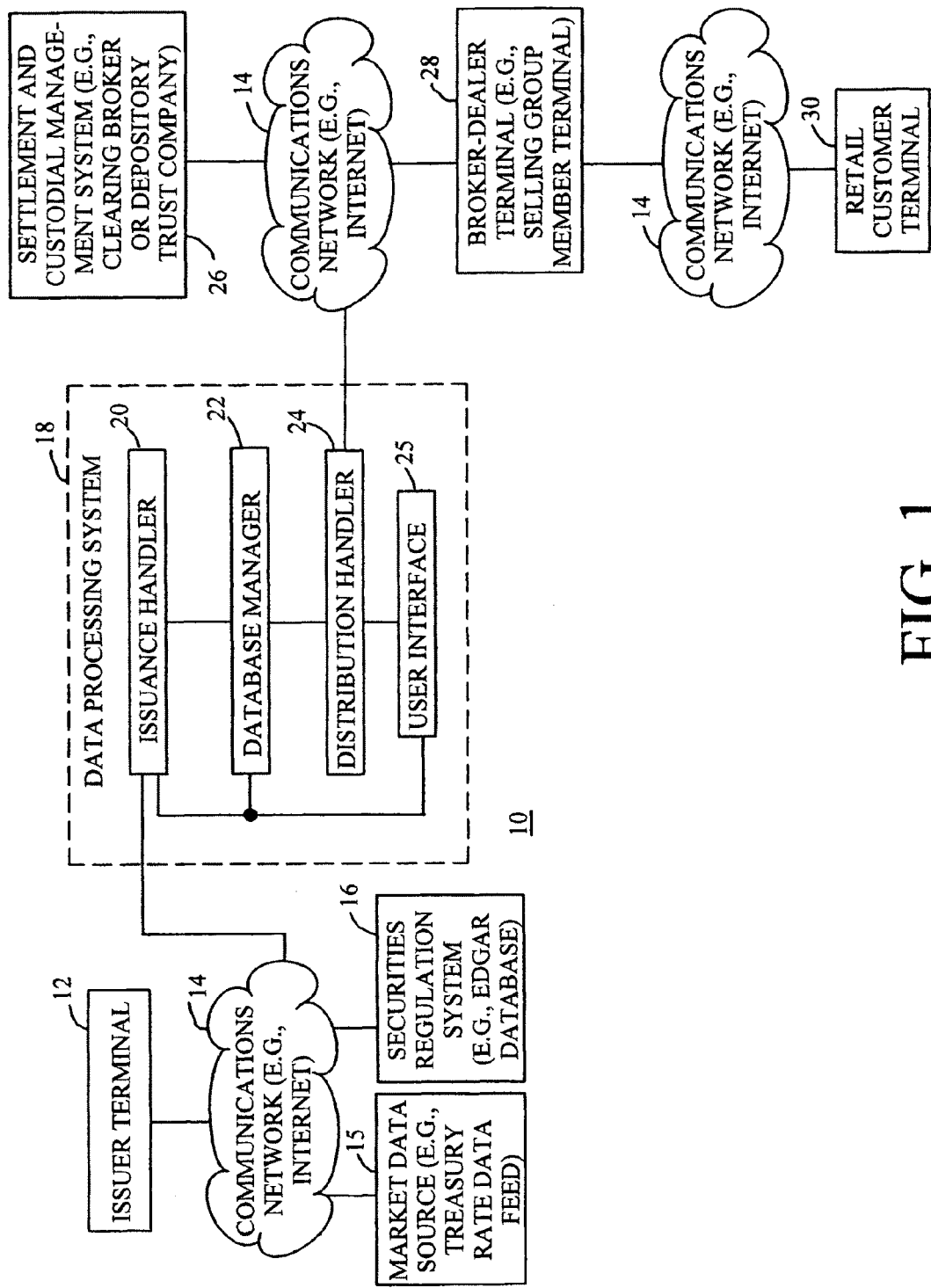
FIG. 1 is a block diagram of a system for distributing financial instruments (e.g., securities) in a primary offering in accordance with the invention.

As an introduction prior to describing FIG. 1, several definitions of terms and concepts applicable to the invention are set forth herein. A financial instrument refers to any financial product, any security, any certificate of deposit, or any fixed-income investment. A security or securities may be defined as any note, bond, debenture, stock, equity interest, hybrid debt-equity interest, an investment contract, or as any other financial instrument that is consistent with the definition of a security in applicable securities regulations (e.g., Securities Act of 1933 and the Securities and Exchange Act of 1934 in the U.S.) A debt security may include any note, bond, debenture, debt interest in an pooled account or trust, hybrid debt-equity interest in a pooled account or trust, convertible bond, convertible note, convertible debenture, a medium term note, or any other financial interest which is regarded as a debt instrument. For example, a debt security may lack voting rights and represent a secured or unsecured obligation that entitles the holder to a payment of interest and principal that depends upon the financial condition of the obligee (e.g., issuer) generally or an account of the obligee.

An issuer is an entity that issues a security or a financial instrument. For example, a corporation may represent an issuer where the corporation directly or indirectly sells securities to investors through a distributor. A distributor of securities is commonly referred to as an underwriter or an investment banker. The underwriter seeks to place securities in an initial offering or a primary offering, where securities are sold by or at least on behalf of an issuer to a purchaser. The underwriter may represent a lead underwriter that organizes a syndicate of selling group members or broker-dealers for the distribution of allotments of the securities.

The underwriter and the issuer generally form an underwriting contract that governs the underwriter's payment for managing the distribution or placement of the securities to purchasers or members of the selling group. The underwriting contract may require the underwriter to purchase a certain quantity of securities from the issuer in a primary distribution. However, the underwriting contract may represent a best efforts arrangement in which the underwriter agrees to use its best efforts to sell a certain quantity of securities and in which the underwriter does not assume the risk if sales of the securities are slow.

Market-based data may include market data, marketing data, or both. Market data refers to an index rate, a credit rating, or another market parameter that tends to vary with changes in market fundamentals. Marketing data refers to characteristics (e.g., financial parameters) of a prior transaction of a previous financial instrument.

In accordance with the invention, FIG. 1 shows a distribution system 10 for distribution of financial instruments (e.g., debt securities or fixed-income securities) pursuant to a primary offering of an issuer. The distribution system 10 includes an issuer terminal 12 that is arranged to communicate with a data processing system 18 via the communications network 14 (e.g., Internet). In turn, the distribution system 10 may communicate with a broker-dealer terminal 28 (e.g., selling group member terminal) via the communications network 14. Although the broker-dealer terminal 28 may support communications with one or more retail customer terminals 30 (e.g., computers equipped with web-browsers) via the communications network 14, the broker-dealer terminal 28 does not need to support such communications where retail customers communicate by telephone, in-person, by facsimile, or otherwise with the broker-dealer.

A market data source 15, a securities regulation system 16, and a settlement and custodial management system 26 are arranged to communicate with the data processing system 18 via the communications network 14 or a communications link. The market data source 15 outputs market information to the data processing system 18 via the communications network 14. The market information may include current market data, such as one or more interest rate indices. Interest rate indices include Treasury bill rates, London Interbank Offering Rate (LIBOR), bank prime rates, commercial paper composite rates, and certificate of deposit composite rates, among others. LIBOR refers to the interest rate offered by a specific group of London banks for U.S. dollar deposits with a specified maturity.

The securities regulation system 16 represents a computer system of a securities regulator (e.g., the Securities and Exchange Commission (SEC)) that supports the electronic filing of financial information by an issuer and/or electronic dissemination of financial information to the public. For example, the securities regulation system 16 may represent the EDGAR (electronic data gathering, analysis and retrieval) database of the SEC or another data processing system that supports registration of securities pursuant to a shelf registration, a company registration, or another form of registration.

The settlement and custodial management system 26 may refer to a data processing system of a clearinghouse (e.g., a clearing broker) or a data processing system of the Depository Trust Company. The Depository Trust Company may act as an intermediary that settles trades for broker-dealer members and keeps ownership records of the securities held by members (e.g., an underwriter) in book-entry form.

In accordance with the invention, the distribution system 10 supports the distribution of a financial instrument (e.g., securities) in a primary offering. The issuer terminal 12 supports the modeling of initial financial parameter data associated with a corresponding proposed financial instrument (e.g., a debt security) based on at least market data to attain a desired financial objective of the issuer. The issuer terminal 12 may transmit the initial financial parameter data (or a posting document representative thereof) from the issuer terminal 12 at an issuer's site to the data processing system 18 at an underwriter's site via the communications network 14. The data processing system 18 and the issuer terminal 12 facilitate collaborative communications between the issuer and the underwriter via the communications network 14 to determine final financial parameter data. The final financial parameter data may be based on one or more of the following: the initial parameter data, a market assessment of the proposed financial instrument, market-based information, and any distribution agreement between the issuer and the underwriter. The data processing system 18 may generate a regulatory filing on the offering for submission to the securities regulation system 16 via the communications network 14.

The regulatory filing is consistent with the final financial parameter data. The data processing system 18 may engage in a transaction for the sale of the financial instrument with the final financial parameters to a purchaser, such as a broker-dealer using a broker-dealer terminal 28.

The data processing system 18 comprises an issuance handler 20, a distribution handler 24, and a database manager 22 that are coupled to a underwriter user interface 25. The issuance handler 20 and the distribution handler 24 may interact directly with each other or via the database manager 22. The issuance handler 20 facilitates one or more of the following activities: (1) negotiation of an underwriting agreement between the underwriter and the issuer through an electronic presentation of the underwriting agreement or essential terms to the issuer and the underwriter; (2) regulatory compliance with applicable securities laws by generating filings for transmission to the security regulation system; (3) providing the issuer terminal 12 with access to the generated regulatory filings to permit modification of the regulatory filings, review by the issuer's attorney, and transmission of the regulatory filing to the securities regulation system 16, (4) providing the issuer terminal 12 with marketing data from historical primary offerings that may have a bearing on a proposed present offering of securities; (5) providing a feed of market data (e.g., a rate index) directly or indirectly from a market data source 15 to the issuer terminal 12; and (6) modeling proposed securities based on current financial parameters, estimated parameters, and/or historic marketing data on previous initial offerings of relevant securities; (7) supporting a call schedule for the issuer of the financial instruments; and (8) supporting an interest payment and rate schedule for the issuer.

The issuance handler 20 may retrieve underwriting templates and underwriting data from the database manager 22 for preparation of the underwriting agreement. Similarly, the issuance handler 20 may retrieve regulatory compliance templates and regulatory compliance data from the database manager 22 for preparation of the regulatory filing. The issuance handler 20 may access the database manager 22 to obtain marketing data on historical primary offerings for transmission to the issuer terminal 12. The issuance handler 20 may retrieve marketing data from the database manager 22 in response to a request from the issuer terminal 12 pursuant to modeling of a proposed offering of securities.

The distribution handler 24 supports one or more of the following activities: (1) monitoring and gathering marketing data, such as historical marketing data and transactional statistics, on primary distributions of financial instruments conducted via the data processing system 18; (2) publicizing and broadcasting a preliminary prospectus, a supplemental prospectus (e.g., a pricing supplement), final financial parameters, or other information on a proposed offering of securities, where the inquiry is phrased as an indication of interest inquiry or an offer, as necessary to be compliant with applicable securities regulations, (3) gathering indications of interest (e.g., in the U.S.) or acceptance of offers (e.g., for European offerings that do not fall under the jurisdiction of the U.S. securities authorities); (4) supporting the execution of sales of the securities and the clearing and settlement of the securities; (5) exchanging appropriate information with the settlement and custodial management system 26 to clear and settle sales of the securities pursuant to the primary offering; (6) assisting the issuer in transferring funds to cover the payment of interest to the holders of the securities held in book-entry form when due; (7) providing on-line financial tools over the communications network 14 for use by the broker-dealers in evaluating instruments offered in one or more primary offerings; (8) providing on-line financial tools over the communications network 14 for use by retail customer terminals 30; and (9) providing advertisements (e.g., electronic tombstone ads) to the retail customers of general types of primary offerings or specific offerings available through the underwriter consistent with applicable securities laws.

The communications networks 14 shown in FIG. 1 may represent the same communications network 14, or different networks. The communications network 14 may refer to the Internet, an intranet, a public switched telephone network, a virtual private network, a dedicated communications line, a packet-switched network (e.g., Asynchronous Transfer Mode network), or any other suitable communications network.

The data processing system 18 has a bias toward favoring electronic communications of electronic documents and data messages over one or more communications networks 14, rather than exchanging information by facsimile, speaking over the telephone, or meeting in-person. Nevertheless, in one embodiment the issuance handler 20 and the distribution handler 24 may be equipped with communications interfaces (e.g., facsimile modems, paging encoders, or wireless data protocol transceivers) for disseminating or broadcasting facsimile messages, pages, or other data messages to subscribers or issuers. The data messages may include e-mail messages that are generated by a human user or pursuant to programming instructions on an automated basis.

In accordance with the invention, the data processing system 18 may output one or more of the following types of data messages or electronic documents: (1) a posting document, (2) an indication-of-interest document, (3) an offering document, (4) a media document, and (5) a trade blotter. A posting document refers to an electronic document or file that includes the initial financial parameters of the financial instrument to be offered in a primary offering. The initial financial parameter data may require further refinement to achieve final financial parameter data that is compatible with the financial goals of the issuer, the financial goals of underwriter, and prevailing market conditions. The posting document may contain data on an underwriting agreement and data relevant to a terms agreement. The posting document may be posted (i.e., made available electronically) by the issuer via the issuer terminal 12 or by the underwriter via a underwriter user interface 25 of the data processing system 18 so as to make the posting document electronically accessible both the issuer and the underwriter.

The indication document is a request from the underwriter to a purchaser that asks for a non-binding indication of interest and any financial terms (e.g. price and quantity of a defined, proposed security) associated with a prospective purchase. The offering document defines an offer to sell securities, solicits an offer to buy securities, or request for a firm commitment to purchase a financial instrument under definite financial terms in a concurrent or subsequent offering.

The indication document or offering document is preferably consistent with final financial parameter data. For example, the indication document or offering document may represent a posting document that has been finalized and possibly modified through agreement of the issuer and the underwriter to attain final financial parameter data for an offered financial instrument.

Once the offering document or indication document is approved, the underwriter may release or publicize the planned offering consistent with market conditions. The media document may represent a press release or an analyst report on the issuer that is permitted under applicable securities laws. The media document may represent a tombstone ad or any permitted publication format that publicizes the offering. The offering document and the media document may incorporate a preliminary prospectus, a supplemental prospectus, or other data to satisfy regulatory requirements. For example, the preliminary prospectus and the supplemental prospectus may be stored as a downloadable, exchangeable format file (e.g., a portable document file (PDF)) for downloading to retail customer terminals 30 or for downloading to broker-dealer terminals 28 via the communications network 14.

The trade blotterrepresents an aggregate running total or indication of interest in the purchases of broker-dealers or others for future purchases of the financial instrument. The trade blottermay be accessible to at least the issuer and the underwriter. For example, the trade blottermay be accessible to the issuer, the underwriter, and the broker-dealers of the distribution group. Acceptance of the terms of any of the foregoing documents or confirmation of receipt of any of the documents may be accomplished by digital signature, password verification, or other security measures.

The electronic exchange of electronic documents and data messages promotes efficiency in the transactions between the issuer and the underwriter, between the securities regulator and the issuer, between the underwriter and the broker-dealer. For example, the electronic exchange of documents and data messages may facilitate reduced negotiation period for an underwriting agreement and terms agreement between the issuer and the underwriter, access to greater and more accurate marketing data for better financial planning of offerings by the issuer, consistent compliance with applicable security laws at lower cost for the issuer, enhanced gathering and aggregation of indications of interest from selling group members by the underwriter, and ultimately reduced transactional costs for the raising of capital by the issuer. Now that the general aspects of the distribution system 10 have been discussed, the distribution system will be discussed in greater detail as shown in FIG. 2.

Figure 2:
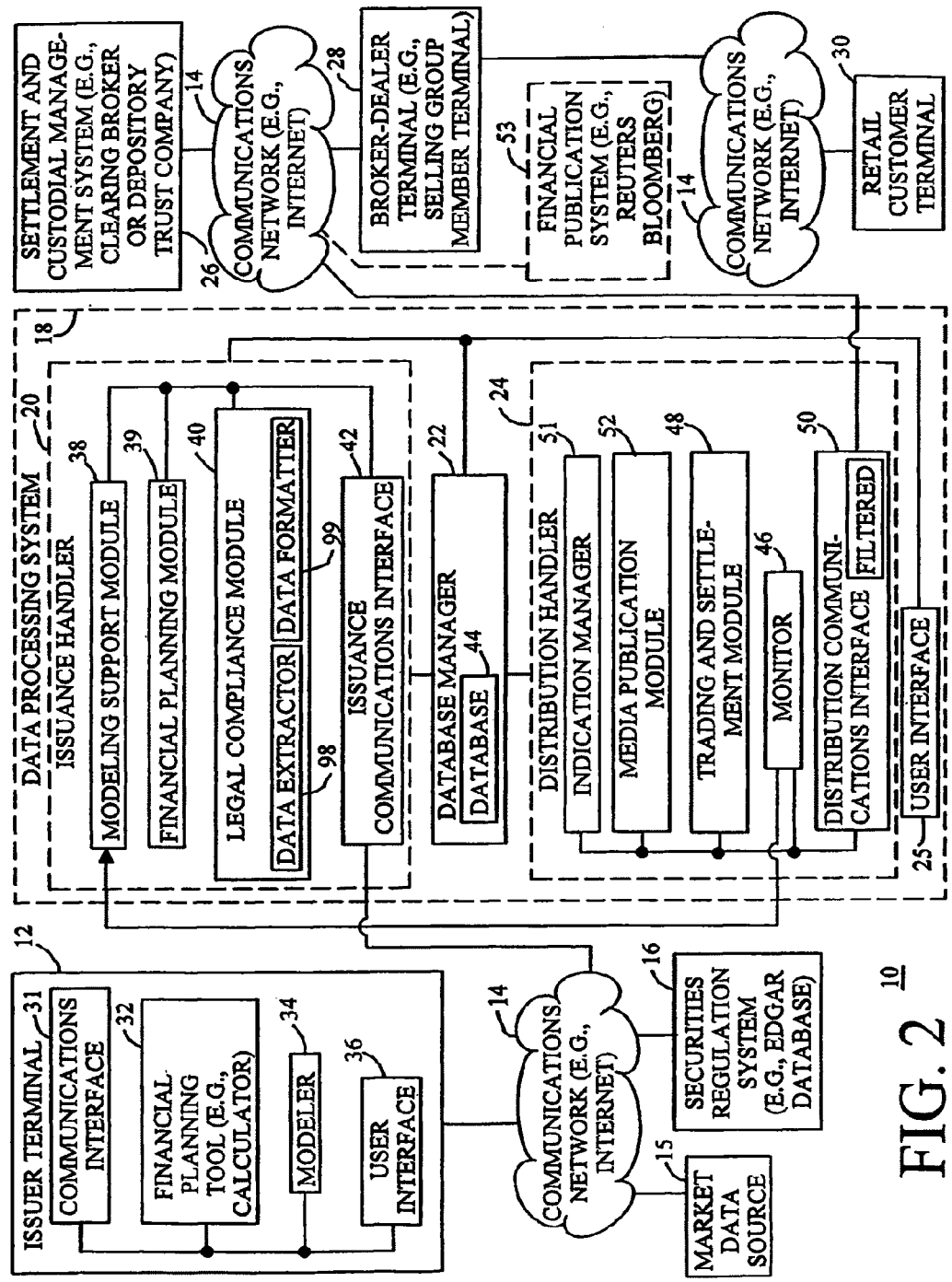
FIG. 2 is a block diagram, which shows illustrative components that may be used to practice the system of FIG. 1.

In FIG. 2, the data processing system 18 includes the issuance communications interface 42 for directing (e.g., transmitting market data directly to the issuer terminal 12 or authorizing the market data source 15 to transmit the data to the issuer terminal 12) market-based data to an issuer terminal 12 via a communications network 14. The market-based data is relevant to a proposed financial instrument. At the underwriter user interface 25, the underwriter may review a posting document or proposal associated with the proposed financial instrument. The posting document contains initial financial parameter data and is accessible via the communications network 14. The initial financial parameter data is related to a preliminary definition of the financial instrument. Through the interaction of the issuer and the underwriter at the issuer user interface 36 and the underwriter user interface 25, respectively, final financial parameter data is approved for a final definition of the financial instrument. The final financial parameter data may replace or supersede the initial parameter data based on the reviewed posting document and the directed market-based data.

In FIG. 2, the issuer terminal 12 includes a communications interface 31, a financial planning tool 32 (e.g., a bond calculator), a modeler 34, and a issuer user interface 36. The communications interface 31, the financial planning tool 32, the modeler 34, and the issuer user interface 36 may exchange data with one another through logical data paths, physical data paths, or both. The lines interconnecting the communications interface 31, the financial planning tool 32, the modeler 34, and the issuer user interface 36 may represent logical data paths, physical data paths, or both.

The communications interface 31 communicates with one or more of the following devices via the communications network 14: the market data source 15, the securities regulation system 16, and the data processing system 18. In practice, the communications interface 31 may comprise a transmitter, a receiver, or a transceiver for communicating data messages (e.g., data packets) over the communications network 14. For example, the communications interface 31 may be arranged to receive index rate data (e.g., Treasury bill data) to on a delayed basis, a live basis (i.e., a real-time basis), or a sufficiently up-to-date basis to facilitate accurate pricing of the offering to market conditions.

The financial planning tool 32 may represent a bond calculator for financial analysis of debt securities or bonds. In one example, the input to the bond calculator may be the coupon rate, a maturity, and a price of the bond. Accordingly, the bond calculator outputs a yield to maturity corresponding to the inputted coupon rate, the inputted maturity rate, and the inputted price. In another example, the input to the bond calculator may be a coupon rate, a maturity, and a yield to maturity. Accordingly, the bond calculator outputs the price given the inputted coupon rate, the inputted maturity, and the inputted yield to maturity.

The modeler 34 refers to a software module for determining the financial characteristics of a financial instrument, or a group of financial instruments, to be offered by the issuer. The modeler 34 is a software module or tool for determining the parameters of the financial instrument (e.g., proposed security) with reference to market-based data (e.g., market data). In general, the parameters of the proposed financial instrument may include yield, coupon rate, the frequency of coupon payments of interest alone, of principal alone, or of both principal and interest, maturity date of the proposed security, whether the security is callable or non-callable, sales price, a spread to a reference interest rate (e.g., spread to Treasury note rate), or another measure of the financial characteristics of the security.

The issuer user interface 36 may represent a graphical user interface, a keyboard and a display, or another device that allows an issuer to use at least one of the communications interface 31, the financial planning tool 32, and the modeler 34. For example, at the issuer user interface 36, the issuer may review a generated regulatory filing provided by the data processing system 18 and approve transmission of the regulatory filing to a securities regulation system 16 via the communications network 14.

The data processing system 18 includes an issuance handler 20 and a distribution handler 24, which are coupled to a database manager 22. The database manager 22 manages the storage and retrieval of information in a database 44 of the database manager 22. The issuance handler 20 manages interactions between the issuer terminal 12 and the data processing system 18 and supports the issuer terminal 12 to facilitate the issuer's issuance of securities.

The issuance handler 20 comprises a modeling support module 38, a financial planning module 39, a legal compliance module 40, and an issuance communications interface 42. The modeling support module 38 provides access of the issuer terminal 12 to marketing data gathered by the monitor 46 of the distribution handler 24 on previous or ongoing distributions of securities. For instance, the modeling support module 38 may transmit or forward marketing data to the modeler 34 of the issuer terminal 12 via the communications network 14. In one example, the modeling support module 38 may transmit marketing data to the modeler 34 in response to a query generated directly or indirectly by the issuer at the issuer terminal 12. In another example, the modeling support module 38 may transmit marketing data at a preestablished time, at regular intervals, at periodic intervals, or the like to the issuer terminal 12 so that the marketing data available for the modeler 34 is regularly refreshed.

The marketing data refers to sales data on previously offered financial instruments, market acceptance data on previously offered financial instruments or any other transactional information on previous transactions of financial instruments that may bear on an investor's decision whether or not to purchase the presently proposed or offered financial instruments. The marketing data may include one or more of the following items on one or more previous transactions of a previous financial instrument: yield, premium over Treasury securities of comparable maturity, rating information from rating agencies relevant to the previous financial instrument, and the identity of the issuer and the identity of the broker-dealers on a previous financial instrument similar to the proposed financial instrument. For example, rating information may include previous and current ratings on the issuer's general debt obligations, which may be relevant to both a previous financial instrument and a proposed financial instrument. The rating information may include a Moody rating, a Standard and Poors rating, a Fitch rating, or any other generally accepted rating. The identities of broker-dealers in previous transactions may help the issuer ascertain the potential demand for a proposed offering of financial instruments.

The legal compliance module 40 references the database 44, information inputted from a issuer user interface 36 of the issuer terminal 12, information inputted from a underwriter user interface 25 of the data processing system 18, or otherwise to form a regulatory filing for filing with a securities regulator (e.g., Securities and Exchange Commission or the London Stock Exchange). In one embodiment, the legal compliance module 40 may comprise a data extractor 98 and a data formatter 99. The data extractor 98 extracts legal compliance data and a legal compliance template (e.g., a prospectus template) from the database 44 and the data formatter 99 formats the extracted data and user input into a proposed regulatory filing, subject to the approval of the issuer (e.g., via a issuer user interface 36 of the issuer terminal 12).

In one example, the legal compliance module 40 supports the filing of one or more documents that are associated with a shelf offering of securities under Rule 415 of the Securities Act of 1933, although the legal compliance module 40 may be updated to conform to virtually any future filing required (e.g., company registration). The legal compliance module 40 may support the preparation of a preliminary or base prospectus, the preparation of a supplement prospectus (e.g., pricing supplement under Rule 424(b)(2) of the '33 Act) or another requisite regulatory filing. A shelf offering refers to an allocation of securities, which are registered, with the securities regulator (e.g., the Securities and Exchange Commission in the U.S.) in advance of the actual sale or distribution of the securities. The issuer takes down securities from the allocation of the shelf to suit the business needs of the issuer and to capture the sometimes ephemeral market conditions that exist.

The 424(b)(2) filing may refer to a supplemental prospectus that includes the pricing terms of a primary offering of securities. The supplemental prospectus supplements a preliminary or earlier prospectus. The preliminary prospectus and the supplemental prospectus defines the terms of an investor's interest in the security and describes financial aspects of the security or the issuer, as required under applicable securities regulations. The complete prospectus may be made available to the broker-dealer terminal 28 for electronic delivery to the retail customer terminal 30 prior to engaging in a transaction with the issuer, underwriter, or the broker-dealer. Under some circumstances, the prospectus may be sent to the retail customer terminal 30 with a confirmation of a trade to an investor and still be considered timely under applicable securities regulations.

The underwriter provides the legal compliance module 40 as a service to the issuer to potentially reduce transactional legal costs. The issuer or the issuer's legal counsel may preview and edit a regulatory filing prepared by the legal compliance module 40 prior to filing the regulatory filing with the securities regulator. In a preferred embodiment, only the issuer, as opposed to the underwriter, has the capability to send and file the regulatory filing as an electronic document from the issuer terminal 12 to the securities regulation system 16. The issuer may chose whether or not to send or modify the regulatory filing by electronically transmitting data or a file via the communications network 14 to the securities regulator or an agent thereof.

The legal compliance module 40 assemblies the regulatory filing from a regulatory compliance template that includes various fields. The legal compliance module 40 may select an appropriate regulatory compliance template from a library of regulatory compliance templates, which may include a generic base prospectus for a shelf offering, a generic supplemental prospectus for filing under Rule 424(b)(2), or a previous base prospectus for a previous offering of the present issuer, a previous supplemental prospectus for a previous offering of the present issuer, or another suitable template. The legal compliance module 40 may preferentially select the previous template of an issuer over the generic template, but the issuer may override such selection.

The selected template has different fields. In one embodiment, the database 44 is accessed to fill the different fields with corresponding information on the issuer and the proposed offering, consistent with user entry into the issuer user interface 36 of the issuer terminal 12. If information is not entered via the issuer user interface 36, the legal compliance module 40 may resort to extracting data from any appropriate previous regulatory filings of the issuer in the database 44, subject to the approval of the issuer. Accordingly, the completion of a regulatory filing is accomplished in an expedited manner, which may result in reduced costs for the issuer by potentially reducing attorney involvement, at least for certain repetitive aspects of the regulatory filing.

An issuance communications interface 42 may comprise a receiver or a transceiver for receiving current market data (e.g., index rate or secondary market quote) associated with the proposed security on an on-going basis. For example, if the proposed financial instrument is traded on a secondary market, the issuance communications interface 42 may receive quotes and other transactional data on the similar or related securities from the market data source 15. The issuance communication interface 42 supports posting a proposal or posting document on the initial financial parameters of the proposed financial instrument (e.g., proposed security) on an electronic bulletin board accessible to the issuer and the underwriter.

In one embodiment, the data processing system 18 stores the posting document in the database 44 and the data processing system 18 assigns a log-in identifier and a password to authorize a grant of access of the issuer terminal 12 to the posting document via the communications network 14. In another embodiment, the issuer terminal 12 stores the posting document in a storage device associated with the issuer terminal 12. Further, the issuer terminals assigns a log-in identifier and a password to grant access of an underwriter via a underwriter user interface 25 to the posting document via the communications network 14.

The issuance communications interface 42 may further support security measures for access of the issuer terminal 12 and the underwriter user interface 25 of the underwriter to the posting document. For example, at the issuer user interface 36 of the issuer terminal 12, the issuer may be required to enter a log-in reference and a password prior to at least one of the issuer terminal 12 and the data processing system 18 granting access to the posting document or permission to modify the posting document. Similarly, at the underwriter user interface 25 of the data processing system 18, the underwriter-user may be required to enter a log-in reference and a password prior to at least one of the issuer terminal 12 and the data processing system 18 grants access to the posting document or permission to modify the posting document.

The distribution handler 24 manages interaction between the data processing system 18 and the broker-dealer terminal 28 via the communication network 14. In one embodiment as shown in FIG. 1, the distribution handler 24 comprises an indication manager 51, a media publication module 52, a trading and settlement module 48, a monitor 46, and a distribution communications interface 50.

The indication manager 51 generates an electronic query or survey to the broker-dealer terminals 28 of the selling group. For example, the electronic query or survey may ask the broker-dealers to determine whether or not they are interested, without any binding obligation, in purchasing a proposed security in a certain amount in a certain primary offering, consistent with prevailing market prices, a defined price range, or a particular price.

The indication manager 51 may aggregate indications of indications of interests from multiple broker-dealer terminals 28 during an indication phase prior to execution phase during which one or more trades are executed based on the aggregated indications of interest. In one embodiment, the indication phase has an aggregation time period of less than seven business days, whereas the execution phase has an execution time period of less than one day. The aggregation time period preferably allows the broker-dealers sufficient opportunity to canvas the interest of retail investors in the proposed or offered financial instrument, consistent with applicable regulations. For example, during an indication phase, each broker-dealer terminal 28 can facilitate aggregating demand for the proposed or offered financial instrument from a large base of retail investors (e.g., at retail customer terminals 30) to facilitate the broker-dealer's placement of an aggregate trade of substantial volume or block trade via the communications network 14.

The media publication module 52 generates electronic offering materials, such as tombstone ads publicizing an upcoming offering, a base prospectus, a base prospectus plus a supplemental prospectus, or other electronic offering materials that conform to applicable standards. The media publication module 52 may broadcast electronic offering materials via e-mail, facsimile, paging protocol, wireless data protocol, or otherwise. The distribution handler 24 may even publish analyst reports about the issuer if the publication of the analyst reports conforms to applicable securities regulations.

The trading and settlement module 48 engages in a transaction for the sale of the security after or upon aggregating indications of interests from multiple broker-dealer terminals 28 during an indication phase. The indication manager 51 may provide the indications of interest, offers to buy financial instruments, or acceptance of offers to sell to the financial instruments to the trading and settlement module 48.

The trading and settlement module 48 may communicate with a settlement and custodial management system 26 or a clearing broker system to support transaction of the securities in the primary offering. Settlement may be typically three business days in same day funds. The financial instruments (e.g., securities) may be cleared and held in book-entry form by DTC, which may facilitate interest payments at maturity or otherwise. Book entry form means that the ownership information on the securities is stored and tracked in electronic form as defined in respective accounts of broker-dealers.

In an alternative embodiment, the transaction of the securities may be cleared by a clearinghouse and delivered to the broker-dealer in certificate form or bearer form by a transfer agent.

The marketing monitor 46 monitors prior transactions of securities that may have a bearing on the present or planned transaction of securities pursuant to a primary offering. The prior distribution of securities may have a bearing on the present or panned offering if one or more of the following factors is present: the identity of the previous issuer and the planned issuer are the same or related, the previous issuer and the planned issuer are in the same industry and have similar market capitalization; and one or more parameters of the proposed securities are analogous to the parameters of the prior securities. The marketing data of the prior distribution may include one or more of the following transactional items: the price of the securities sold, the quantities of securities sold and any associated corresponding security parameters, identifier of the underwriter, identifier of the selling group members, the date of the prior distribution, general financial market statistics (e.g., treasury note interest rates) at the time of the prior distribution, and any other transactional data on a previous primary distribution.

The distribution communications interface 50 supports communications over the communications network 14 to one or more of the following devices: the settlement and custodial management system 26, the broker dealer terminal 28, and the retail customer terminal 30. In practice, the distribution communications interface 50 may comprise a receiver, a transmitter, or a transceiver for communication data messages (e.g., data packets) via the communications network 14.

A broker-dealer terminal 28 may invoke filtering of data messages by the distribution communications interface 50. The broker-dealer 28 may block or tailor the transmission of one or more indication documents or offering documents from the data processing system 18 to the broker-dealer terminal 28 by specifying filtering parameters or desired characteristics of the proposed financial instrument or the issuer. A desired characteristic includes meeting or exceeding minimum rating of the issuer's debt or matching an identity of the issuer. For example, the database manager 22 maintains a database of the filtering parameters or desired characteristics and the blocks the transmission of offering documents or indication documents from the data processing system, if the minimum credit rating associated with a proposed offering does not meet or exceed a minimum threshold level (e.g., BBB). Accordingly, broker-dealers 28 may subscribe to receive information on primary offerings that they are interested in, while screening out primary offerings that do not meet their desired characteristics.

The database manager 22 includes a database 44. In general, the database manager 22 supports storage and retrieval of marketing data, legal compliance data, legal compliance templates, trading and settlement data, or other data associated with the distribution of securities or supportive of the operation of the components of the distribution system 10. For example, the database 44 may store data related to the regulatory filing, initial financial parameters and final financial parameters. Similarly, the database 44 may store marketing data on historical transactions of securities of similar character to the security presently being distributed.

A database manager 22 supports the gathering of market-based data (e.g., marketing data) on at least one previous securities transaction having characteristics similar to or pertinent to characteristics of the initial financial parameter data, the final financial parameter data, or both. For example, the database manager 22 gathers marketing data on at least one previous transaction during or following the execution of the at least one previous transaction. The market data includes at least one of the following: whether the financial instrument of the previous transaction was callable or noncallable; a term to maturity of the financial instrument; a coupon frequency of the financial instrument, a purchase price of the financial instrument, a volume purchased of the financial instrument, a selling group identifier of selling broker-dealers participating in the transaction of the financial instrument, a yield or interest rate of the financial instrument, a date of the transaction, and a prevailing index interest rate as of the time of the transaction. The final parameter data includes at least one of the following: whether the financial instrument is callable or noncallable; a term to maturity of the financial instrument; a coupon frequency of the financial instrument, a purchase price of the financial instrument, a total quantity offered of the financial instrument, a selling group identifier of selling broker-dealers participating in the transaction of the financial instrument, and a yield or interest rate of the financial instrument. The database 44 may store a data structure as a group of files, as an object-oriented hierarchy, or in some other suitable fashion.

Figure 3:
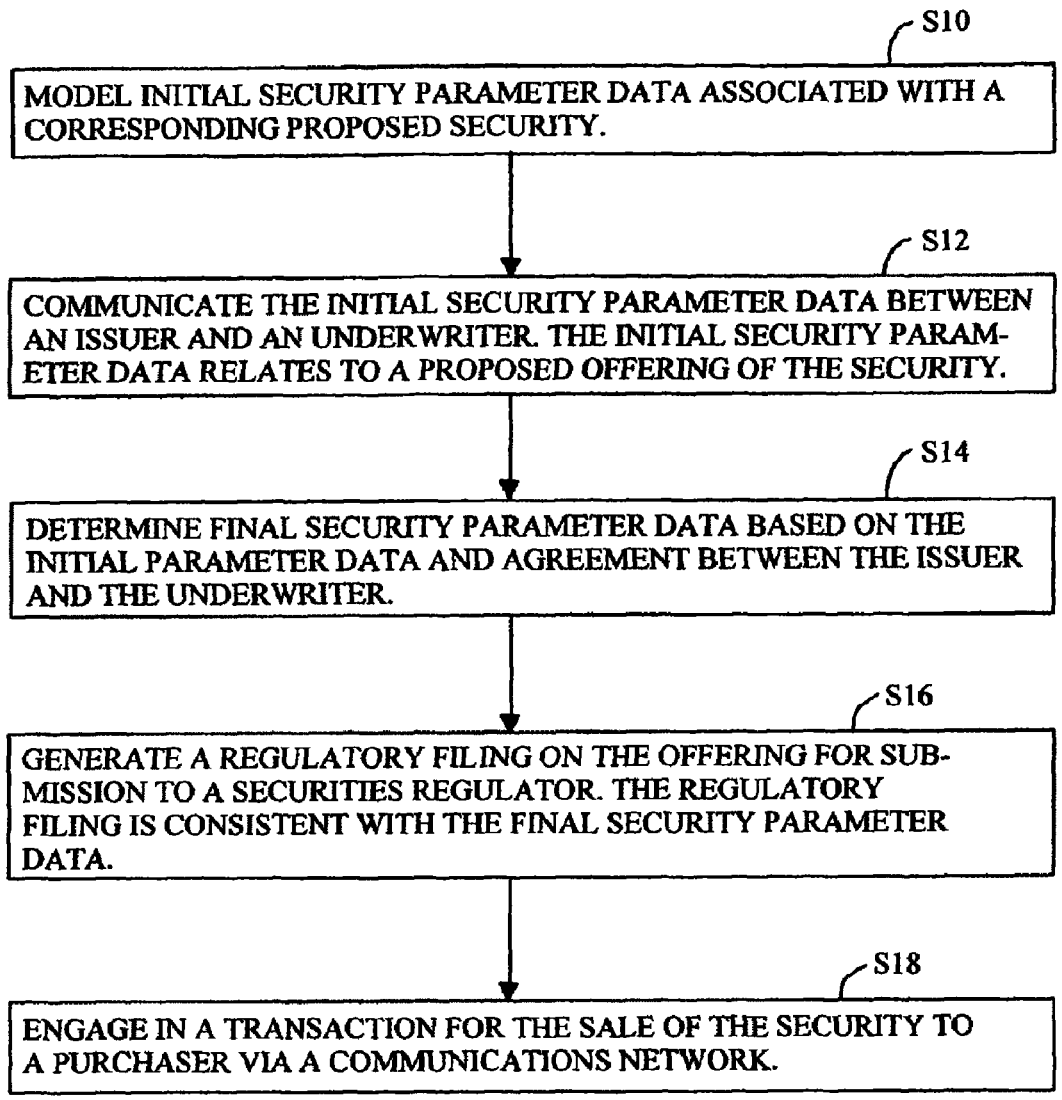
FIG. 3 is a flowchart for distributing financial instruments in a primary offering in accordance with the invention.

FIG. 3 is a flow chart of a method for distributing securities in a primary offering in accordance with the invention. The method of FIG. 3 starts in step S10.

Prior to step S10, marketing data may be gathered on at least one previous securities transaction having characteristics similar to characteristics of initial parameter data. For example, the monitor 46 of the data processing system 18 may gather market-based data (e.g., marketing data) on at least one previous transaction of the distribution of securities. The market-based data includes at least one of the following on a prior offering of a previous financial instrument: historical parameter data to assist in the selection of initial parameter data, whether the financial instrument of the previous transaction was callable or noncallable; a term to maturity of the financial instrument; a coupon frequency of the financial instrument, a purchase price of the financial instrument, a volume purchased of the financial instrument, a selling group identifier of selling broker-dealers participating in the transaction of the financial instrument, a yield or interest rate of the financial instrument, a date of the transaction, and a prevailing index interest rate as of the time of the transaction.

In step S10, an issuer terminal 12 or modeler 34 models initial financial parameter data associated with a corresponding proposed financial instrument (e.g., proposed security). In one embodiment, the initial financial parameters of the financial instrument may include one or more following parameters: coupon characteristics, maturity characteristics, principal characteristics, interest characteristics, and format characteristics. A coupon characteristic may include the frequency of coupon payments and a method for determining an amount of a coupon payment. In one embodiment, frequency of coupon payments may include a library of payment frequencies, such as semi-annual, monthly, quarterly, bimonthly, annually, at maturity, or zero coupon. If the maturity of the financial instrument is less than one year in duration, the frequency of coupon payment may be restricted to one payment at maturity of the financial instrument. Maturity characteristics may include the maturity date or dates or a method for determining a maturity date. Principal characteristics may include a cap on the aggregate principal amount of the securities to be offered in a primary offering, the percentage of the principal amount of the securities at issuance, and the principal amount payable upon acceleration to maturity. The interest characteristics may include interest rate per annum, whether the interest rate is fixed or variable, method for determining the interest rate, date from which interest accrues, the date from which interest is payable, and the record data for interest payment. The format characteristics may include the form the financial instruments are issued (e.g., registered or bearer form), restrictions in transferring from one form to another, whether the securities are to be issued in the form of a global security, and the identity of the depository of the global security, currency units in which the securities may be purchased and in which the securities are payable.

In accordance with step S10, the modeler 34 and the modeling support module 38 may cooperate to define initial financial parameters for a prodigious assortment of financial instruments. The modeler 34 may establish initial financial parameter data based in market data and a target characteristic of the financial instrument. The target characteristic may comprise a target spread to treasury and a target coupon rate of the financial instrument. A target spread to treasury refers to the difference in basis points (or percentage) between the yield to maturity for a particular financial instrument and Treasury yield. The target coupon rate refers to one or more interest payments (e.g., a periodic interest payment) that is payable to a holder of the financial instrument during the life span of the financial instrument. The market data may represent a Treasury rate index or another index.

In one example, the initial financial parameters modeled in step S10 may define a medium term note in which the maturity ranges from 9 months to at least 30 years. In another example, the initial financial parameters may define a medium term note with maturity from two to five years. A medium term note may comprise a fixed-rate, non-redeemable, senior debt security, although the medium term note may be issued as a floating rate, a zero-coupon bond, or with other characteristics.

Step S10 may include modeling of a proposed financial instrument to facilitate one or more of the following: (1) the optimization of the proper pricing of the offered financial instrument, (2) the optimization of the initial and final financial parameters (e.g., financial terms) of the proposed financial instrument, (3) a framework for optimization of the final security parameter data, and (4) optimization of market fundamentals and timing with respect to the offered financial instrument.

In step S12, initial security parameter data is communicated between an issuer and an underwriter. In one example, the issuer terminal 12 communicates the initial financial parameter data to a data processing system 18, which may be affiliated with an underwriter. In another example, the underwriter may originate the posting of the posting document or proposal in an electronic format accessible via a communications network 14 (e.g., on an electronic bulletin board accessible to the issuer and the underwriter). In yet another example, the issuer originates the posting of the posting document or proposal in an electronic format accessible via a communications network 14.

The posting document refers to an electronic document which is accessible, viewable, and modifiable by both the issuer terminal 12 and a underwriter user interface 25 of the data processing system 18, subject to any security measures (e.g., password, encryption, authentication) provided by the distribution system 10. In one embodiment, the posting document may be placed on an electronic bulletin board that is accessible by the issuer and the underwriter upon successful entry of a password and a log-in identifier. The posting document supports collaboration between the issuer and the underwriter in establishing final financial parameters for the proposed offering of securities. The distribution system 10 may allow previously negotiated deals between the particular issuer and underwriter (e.g., previous posting documents) to be readily available from database 44 as models or starting points for negotiation and collaboration of new deals on the distribution of financial instruments to promote the efficiency of primary offerings.

Although step S12 primarily includes the communication of initial security parameter data as shown in FIG. 3, in an alternate embodiment, the underwriter and the issuer may exchange data or post a proposal on one or more of the following: the initial financial parameters of the proposed security, parameters of a terms agreement (e.g., formal pricing agreement for the issuance of securities), and parameters of an underwriting agreement. The terms agreement between the underwriter and the issuer may include security parameters such as the following parameters: principal amount of the debt, specified maturity date, range of maturity dates, percent interest of the coupon, price to public, underwriting discount price, or the like. The underwriting terms agreement between the issuer and the underwriter may include one or more of the following terms related to a debt security: a percent interest rate of maturity, a specified maturity, and a price to the public. In one example, the terms agreement is based on or incorporates a detailed underwriting agreement that is filed as an exhibit to the registration statement filed under Rule 415.

In step S14, the issuer and the underwriter determine final financial parameter data based on the initial parameter data by reaching a consensus between the issuer and the underwriter. A communications interface 31 of the issuer terminal 12 and an issuance communications interface 42 of the data processing system 18 communicate with each other to support the display or presentation of the initial parameter data, and modification or acceptance of initial parameter data as final financial parameter data. In one embodiment, the final parameter data may include at least one of the following on the proposed financial instrument: whether the financial instrument is callable or noncallable; a term to maturity of the financial instrument; a coupon frequency of the financial instrument, a purchase price of the financial instrument, a total quantity offered of the financial instrument, a selling group identifier of selling broker-dealers participating in the transaction of the financial instrument, and a yield or interest rate of the financial instrument providing current market data associated with the proposed financial instrument on an ongoing basis.

The issuer and the underwriter may address the posting document or the contents of the underwriting agreement and a terms agreement simultaneously with or after the final financial parameters are determined. The final financial parameter data has sufficient detail to permit the underwriter to proceed with gathering indications of interest, but not necessarily sufficient detail to afford the preparation of a pricing supplement concerning the definite pricing of the offered securities.

In step S16, the legal compliance module 40 may generate a regulatory filing on the offering of the financial instrument with the final financial terms for submission to a securities regulator. The regulatory filing is consistent with the final financial parameter data. The legal compliance module 40 may use information inputted into the issuer terminal 12 or information transmitted from the issuer terminal 12 to a data processing system 18 via a communications network 14. The legal compliance module 40 places the obtained information into a template suitable for a particular regulatory filing. At the issuer terminal 12, the issuer or its legal representative may review the prepared regulatory filing formed by the legal compliance module 40. Further, the issuer terminal 12 preferably supports transmission of the prepared regulatory filing, as edited by the legal representative, to the securities regulation system 16 via the communications network 14 to facilitate efficient, cost-effective legal compliance. The underwriter and the issuer may agree to file a regulatory filing (e.g., the pricing supplement) after the gathering of indications of interest consistent with applicable legal requirements. Therefore, step S16 may not necessarily follow step S14 and may occur at any time that is consistent with the state of financial regulation or securities regulation in the region in which securities are offered.

In step S18, the data processing system 18 supports the issuer's engaging in a transaction for the sale of the financial instruments (e.g., securities) by exchanging data between the data processing system 18 and the broker-dealer terminal 28 underlying the transaction.

Figure 4:
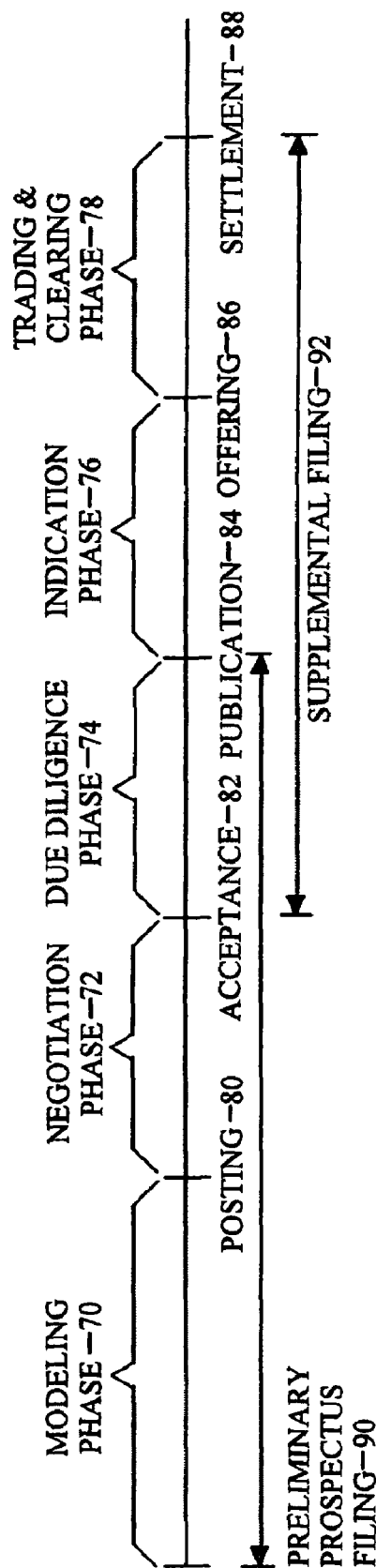
FIG. 4 shows a diagram of an illustrative time line for the distribution of securities in accordance with the invention.

FIG. 4 is a time line that illustrates various phases in the distribution of securities as financial instruments pursuant to a shelf registration statement under Rule 415 of the Securities Act of 1933.

The securities distribution process may start with a modeling phase 70 in which the issuer models a security to be offered to achieve the desired financial objective of the issuer. Once the issuer has modeled a security that the issuer wishes to offer in a primary offering at a posting 80, the issuer may post the modeled security as a posting document that is observable and modifiable over the communications network 14 by the issuer and the underwriter. The posting 80 marks the boundary between the modeling phase 70 and the negotiation phase 72.

In the negotiation phase 72, the issuer and the underwriter communicate over the communications network 14 to resolve any material differences in the terms or financial parameters of the security to be offered in the proposed offering. Once the issuer and the underwriter have reached an agreement and established final financial parameters, the issuer and underwriter may formalize their understanding with an acceptance 82.

After the acceptance 82, the underwriter may fulfill any duty of disclosure under the securities laws by conducting due diligence phase 74 on the financial matters of the issuer. Once the underwriter has satisfied the due diligence obligation, the underwriter may publicize the proposed offering of securities by seeking indications of interest in a publication 84.

The indication phase 76 may last a duration which is sufficient to allow broker-dealers to indicate their interest in the proposed offering by canvassing their clients (e.g., retail customers) or otherwise. After the indication phase 76, the offering of the securities is conducted and trading 86 of the securities occurs. The offering demarcation is followed by a trading and clearing phase 78, which ends in settlement 88.

The legal compliance aspects for securities regulation include a preliminary prospectus filing 90 and a supplemental filing 92. As indicated by one line terminating in arrows, the preliminary prospectus filing 90 may occur prior to the modeling phase 70 or at another appropriate time prior to the publication 84. As indicated by another line terminating in arrows, the supplement filing 92 may occur as early as the publication 84 or acceptance 82 once pricing terms have been established for the offering, for example.

The details of the timing of the preliminary prospectus filing 90 and the supplement filing 92 are largely dependent upon securities regulations, which may differ from country to country. In the U.S., an S-3 or F-3 issuer may file a shelf registration statement under Rule 415 of the 1933 Act. An S-3 issuer may be defined as an issuer that has been a reporting company for minimum time period (e.g., for at least one year, the issuer's has been listed on the New York Stock Exchange) and a minimum public float of voting stock with a minimum aggregate market value (e.g., a value of at least 75 million dollars) or as prospectively modified by the Securities and Exchange Commission. An F-3 issuer is similar to S-3 issuer, except an S-3 issuer refers to a domestic company that is permitted to register securities on a Form S-3, whereas an F-3 issue refers to a foreign company that is permitted to register securities on a form F-3.

A shelf registration allows the issuer to sell the securities on a continuous basis or from time to time in a series of successive offerings. Shelf registrations may apply to debt offerings, equity offerings, or any mixture of debt and equity offerings. The registration statement filed pursuant to Rule 415 may specify an aggregate amount of securities without allocating the amount of debt or the amount of equity securities. The aggregate amount of securities is supposed to be limited to an amount that "is reasonably expected to be offered and sold within 2 years from the registration statement." Once all of the securities in the shelf registration statement are offered and sold, the issuer may file a new shelf registration statement. An S-3 or F-3 issuer may incorporate 1934 Act reports (e.g., 10K annual report, and 10 Q quarterly reports, and 8-K significant event disclosure) into the shelf registration statement by reference to keep the shelf registration up-to-date with current financial data and the occurrence of material events.

The supplemental prospectus must be filed within two days after the execution of the terms agreement that includes the pricing or within two days after a first public offering or first sale, whichever is sooner under Rule 424(b)(2) of the Securities Act of 1933. For a firm commitment underwriting, the terms agreement frequently includes a price of the securities and a closing date of the transfer of the securities from the issuer to the underwriter. In a firm commitment deal, the underwriter agrees to purchase a certain amount of securities from the issuer at a discount from the public offering price, often after the underwriter has gauged the interest of investors and participating broker-dealers in purchasing the securities from the underwriter. For a best efforts underwriting, the terms agreement may merely state that the securities are to be sold at market price using the best efforts of the underwriter. In a best-efforts underwriting, the underwriter acts as an agent of the issuer and does not purchase the securities from the issuer. Accordingly, the issuer assumes all risk of not selling the securities if the market does not receive the primary offering in a favorable manner. A best efforts underwriting distribution may be subject to an "all or nothing" basis in which unless some minimum number of the securities are sold by a specific date, all funds of the investors will be refunded and the primary offering will be, in effect, canceled.

Accordingly, the underwriter may file a supplemental prospectus even after an offer and sale of the securities have been made under some circumstances. The supplemental prospectus supplements the original prospectus filed under Rule 415. The supplemental prospectus discloses the public offering price, a description of the securities, specific method of distribution, or similar matters under Rule 424(b)(2). The Securities and Exchange Commission does not typically take any action to make the supplemental prospectus effective.

Figure 5:
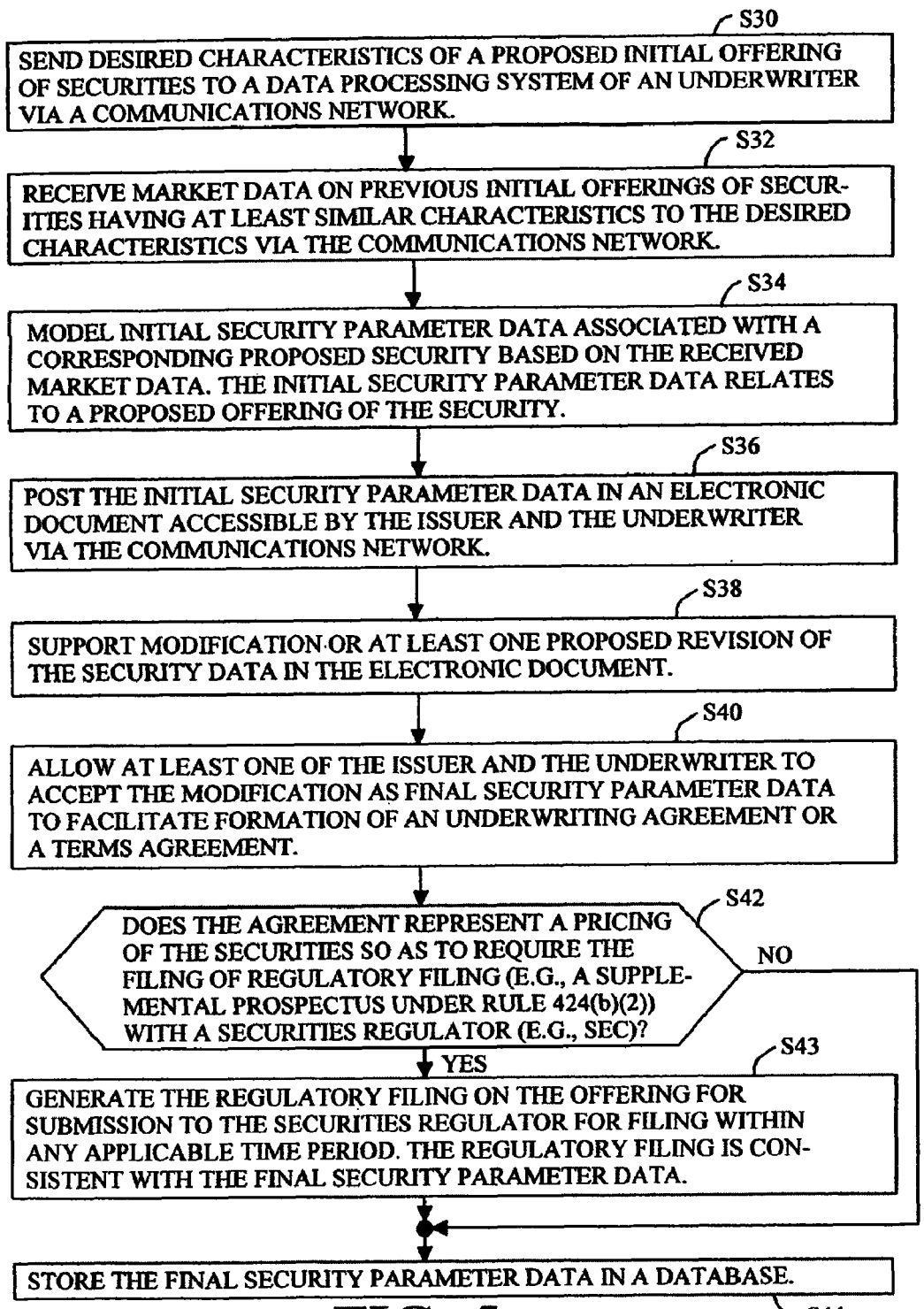
FIG. 5 is a flow chart of an issuance procedure for the distribution of securities in accordance with the invention.

FIG. 5 is a flow chart that illustrates an issuance procedure in the distribution of financial instruments (e.g., securities) in accordance with the invention. The method of FIG. 5 starts in step S30.

In step S30, an issuer terminal 12 sends a desired characteristic of a proposed initial offering of financial instruments (e.g., securities) to a data processing system 18 of an underwriter via a communications network 14. Upon receipt of the desired characteristic, the data processing system 18 may perform a search and retrieval process of a database 44 containing marketing data on prior primary offerings of securities that are relevant to the proposed initial offering.

In step S32, the issuer terminal 12 receives market-based data on previous initial offerings of securities that have at least similar characteristics to the desired characteristics. The similar characteristics may include identity of the issuer, market capitalization of the issuer, industrial classification (e.g., standard industrial code) of the issuer, amount of principal to be offered pursuant to the initial offering, an index interest rate at the present time or an estimated index interest rate at the time of the proposed offering, other parameters of the securities to be offered pursuant to the primary offering.

In step S34, the issuer terminal 12 or modeler 34 models initial financial parameter data associated with a corresponding proposed security based on the received market-based data. The initial financial parameter data relates to a proposed offering of the security. The market-based data may include market data on previous initial offerings of securities, current index interest rates, or both. The modeler 34 allows the issuer to determine if the issuance of securities will meet the issuer's financial objectives based upon the current dynamics of the market. If the modeler 34 indicates that the issuer's spread above an index rate or the interest payment terms will not be acceptable to the issuer, the issuer can drop the prospect of an imminent offering for an improvement in market conditions without using the valuable human resources of the underwriter. On the other hand, if the modeler 34 indicates that the issuer can issue a security with terms that comply with the issuer's preferences, the issuer can begin negotiation of one or more of the following with the underwriter: final financial parameter data, an underwriting agreement, and a terms agreement.

In step S36, the issuer terminal 12 posts the initial financial parameter data in an electronic document (e.g., a posting document), which is accessible by the issuer and the underwriter via the communications network 14. The issuer terminal 12 may post initial financial parameter data that forms a basis for a terms agreement between the issuer and the underwriter. The format of the initial financial parameter data is preferably standardized to support ready analysis by the underwriter via a underwriter user interface 25 of the data processing system 18.

In step S38, the data processing system 18 and the issuer terminal 12 support modification or revision of the financial parameter data in the electronic document. Pursuant to step S38, the underwriter may make a judgment call as to whether a sufficient market exists for the issuance of the securities under the proposed terms as reflected in the initial financial parameter data. The underwriter has knowledge of the market from other transactions with other issuers that may assist in ascertaining the status of the market. Further, the underwriter may review the market-based data available from the database manager 22 on previous distributions of securities, which are analogous to the securities with the initial financial parameter data. Moreover, the underwriter may gather indications of interest from selling group members or other investors as to the initial financial parameters. The underwriter may determine from the indications of interest that that the initial financial parameter data may be revised to achieve greater market acceptance or that the initial financial parameter data will likely receive adequate market acceptance.

If the underwriter determines that the initial financial parameter data is consistent with adequate market acceptance, the underwriter does not modify the initial security data, other than indicating the initial security data may be designated as final security data.

In step S40, the issuer terminal 12 and the data processing system 18 accept or acknowledge the modified initial financial parameter data or the unmodified security parameter data as final financial parameter data, as is appropriate. The final financial parameter data facilitates formation of an underwriting agreement, a terms agreement, or both. The issuer and the underwriter may readily and conveniently indicate their acceptance of the posting document by data messages.

In step S42, the data processing system 18, the underwriter, and the underwriter's legal advisor may determine if any agreement (e.g., the terms agreement or the underwriting agreement) represents a pricing of the securities so as to require the filing of a regulatory filing (e.g., a supplemental prospectus under Rule 424(b)(2) of the 1933 Act) with a securities regulator (e.g., the SEC). If it is determined that the agreement represents a pricing of the securities, the method continues with step S43. If it is determined that the agreement does not represent a pricing of the securities, the method continues with step S44.

In step S43, the data processing system 18 or the legal compliance module 40 generates the regulatory filing for filing within any applicable time period (e.g., by the end of the second business day after pricing or signing of a firm commitment underwriting deal). The regulatory filing is consistent with the final financial parameter data.

In step S44, the final financial parameter data may be stored in a database 44. The database 44 may be used for future reference in executing a trade of the securities, for example.

The method of FIG. 5 primarily applies to the present regulatory environment in the U.S. Although the method of FIG. 5 includes steps S42 and step S43, steps S42 and S43 may be deleted for distributions of securities in countries where U.S. laws are not applicable. Further, if U.S. laws change in the future, steps S42 and S43 may be deleted or modified to conform to prospective securities distribution practices so long as such deletion or modification is consistent with applicable U.S. laws then in effect.

Figure 6:
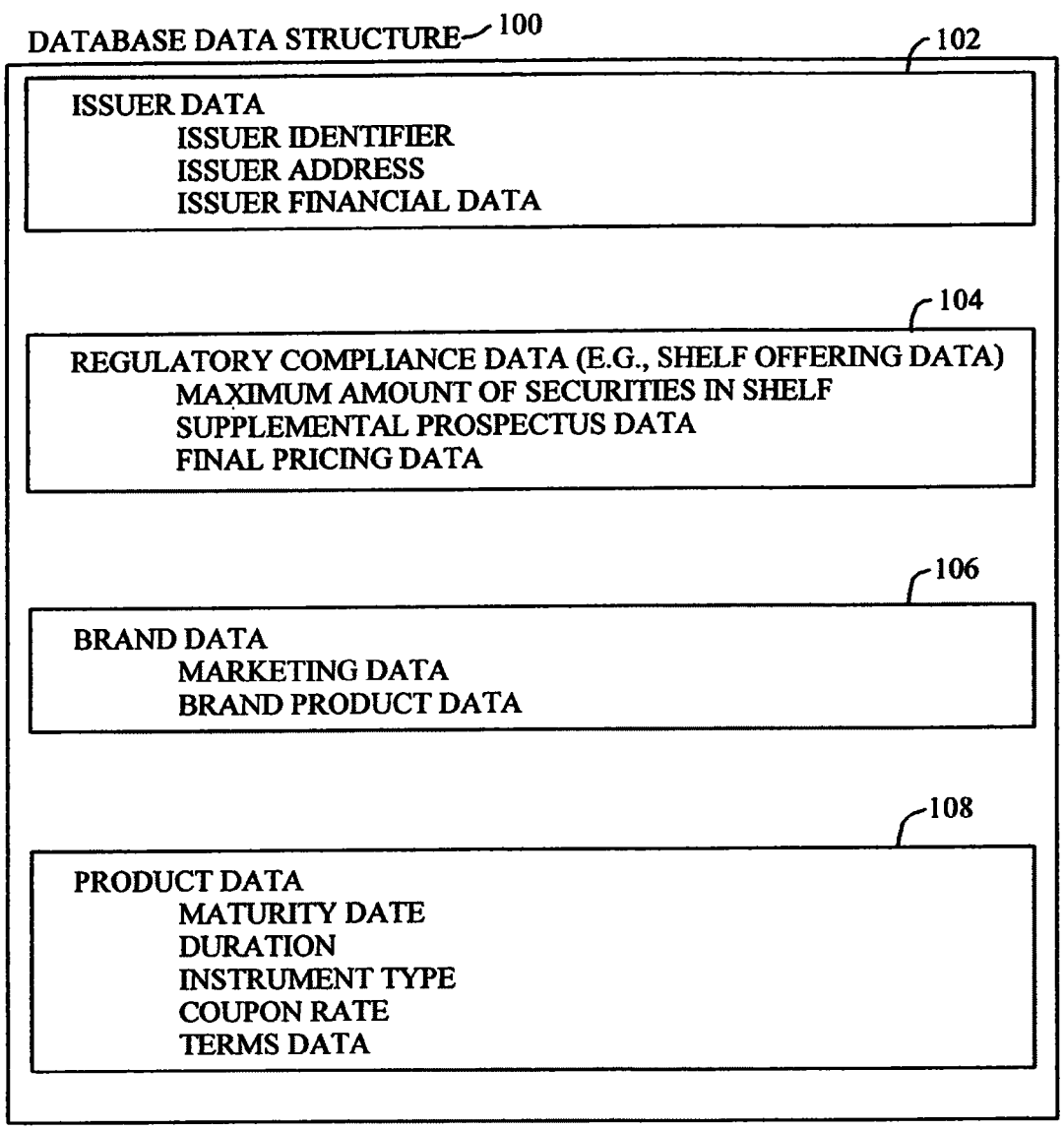
FIG. 6 is a diagram of a data structure for a database that may be used to support the system of the invention.

FIG. 6 shows an illustrative data structure of data that may be stored in the database 44. The data structure includes issuer data 102, regulatory compliance data 104, brand data 106, and product data 108 as different classifications of data.

The issuer data 102 may include an issuer identifier, an issuer address, and issuer financial data (e.g., market capitalization).

The regulatory compliance data 104 (e.g., shelf offering data) may include a maximum amount of securities registered under a current shelf registration statement under Rule 415 of the Securities Act of 1933. The regulatory compliance data 104 may include supplemental prospectus data and final pricing data to facilitate compliance with Rule 424(b)(2).

In an alternate embodiment, where the initial offering is not subject to U.S. securities laws, the regulatory compliance data 104 may be adjusted or omitted as appropriate and necessary to comply with the securities laws in effect in the foreign country or countries in which the initial offering occurs.

The brand data 106 includes marketing data and brand product data 108. Marketing data includes historical marketing data on a particular product type or types of financial instruments offered in previous initial offerings. A product type includes a bond, a certificate of deposit, a preferred stock, or a money market fund, for example. A product type (e.g., debt security) may be associated with a corresponding brand identifier (e.g., Internotes corporate bond note, which is a trademark of Integrated Holdings, LLC). The brand data 106 may include the maturity data, duration, instrument type, coupon rate, and terms data for a previous initial offering of securities.

The product data 108 includes maturity date, duration, instrument type, coupon rate, and terms data for products to be offered in a planned offering.

The regulatory compliance data 104, the brand data 106 and the product data 108 are affiliated with an issuer identifier so that the data of different issuers can be identified. The issuer terminal 12 may support the entry or modification of data in the database 44. Similarly, a underwriter user interface 25 of the data processing system 18 may support the entry or modification of data in the database 44. The monitor 46 may facilitate the gathering and storage of brand data 106 in the database 44.

Figure 7:
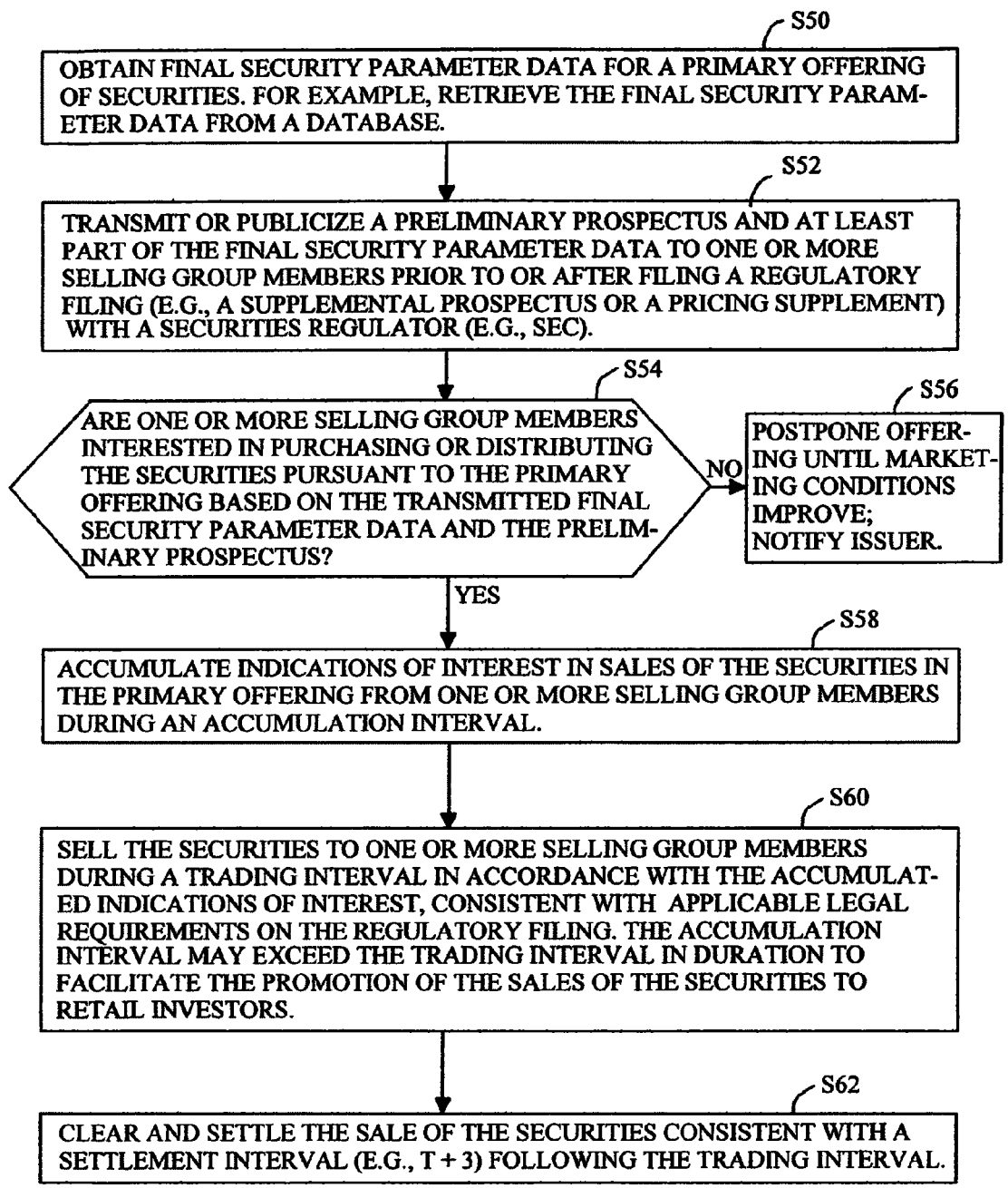
FIG. 7 is a flow chart of a distribution procedure for the distribution of securities in accordance with the invention.

FIG. 7 shows a flow chart of a method for distributing securities in accordance with the invention. The method of FIG. 7 starts in step S50.

In step S50, a data processing system 18 obtains final financial parameter data for a primary offering of financial instruments (e.g., securities). For example, the data processing system 18 retrieves the final financial parameter data from a database 44.

In step S52, the data processing system 18 or an indication manager 51 transmits or publicizes a preliminary prospectus and at least part of the final financial parameter data to one or more selling group members prior to or after filing a regulatory filing (e.g., a supplemental prospectus or a pricing supplement) with a securities regulator (e.g., the SEC). For example, the indication manager 51 transmits the preliminary prospectus to the broker-dealer terminals 28 to allow the broker-dealers to distribute the preliminary prospectus to retail customers via the retail customer terminal 30.

In step S54, the data processing system 18 or an indication manager 51 determines if one or more selling group members are interested in purchasing or distributing the financial instruments pursuant to the primary offering based on the transmitted final financial parameter data and the preliminary prospectus. For example, the indication manager 51 may transmit or broadcast a request for indications of interest to selling group members, where the request includes at least the final financial parameter data and a preliminary prospectus. If the one or more selling group members are interested in purchasing or distributing the financial instruments, the method continues in step S58. If one or more selling group members are not interested in purchasing or distributing the financial instruments, the method continues in step S56.

In step S58, the distribution handler 24 of the data processing system 18 or the indication manager 51 accumulates indications of interest in sales of the financial instruments (e.g., securities) in the primary offering from one or more selling group members during an accumulation interval or indication phase. The indication phase may be referred to as an offering phase if securities are offered for sale.

The underwriter may stop of the offering during the indication phase or offering phase via the underwriter user interface 25 on a discretionary basis (e.g., if market conditions severely deteriorate or if an unexpected material financial event of the issuer occurs). However, prior to the stoppage of the primary offering, the underwriter may warn broker-dealers and honor outstanding commitments to sell securities on a full or limited basis.

In step S56, the data processing system 18 may alert an underwriter, the issuer, or both at the user interfaces (25, 36) so that the underwriter and issuer can postpone the offering until market conditions improve.

In step S60, the data processing system 18 or the distribution handler 24 sells the financial instruments (e.g., securities) to one or more selling group members during a trading interval in accordance with the accumulated indications of interest (accumulated in step S58), consistent with applicable legal requirements on the regulatory filing. The accumulation interval may exceed the trading interval in duration to facilitate the promotion of the sales of the financial instruments to retail investors.

During or after the sales of the securities, the monitor 46 of the data processing system 18 determines the identity of the selling group member, the quantity of securities purchased by the selling group member, the purchase price for the transaction, and the date of the transaction for storage in the database 44. The monitor 46 may store an index interest rate applicable to the transaction or as of the transaction date. The monitored data may be associated with the final financial parameter data in the database 44 to form marketing data or historical marketing data that is used by the issuer, the underwriter or both for pricing and terms establishment of future offerings of securities. Accordingly, the data in the database 44 may be accessible to the issuer terminal 12, a underwriter user interface 25 of the data processing system 18, or both.

During of after step S60, the data processing system 18 may assign a CUSIP (Committee on Uniform Securities Identification Procedures) number as of the trade date of a security, such as a bond. The CUSIP provides an identification for a corresponding security. A CUSIP number may be selected and assigned from a pool of CUSIP's provided by the issuer. Once a CUSIP number is used, the CUSIP number is removed from the pool so each security has a unique CUSIP identifier.

In step S62, the data processing system 18 supports the clearance and settlement of the sales of the financial securities within a settlement interval following the trading interval. For example, the data processing system 18 may exchange necessary information with a settlement and custodial management system 26 to support settlement of the trade and holding of the traded securities in book-entry form. Although holding the traded securities in book-entry form is preferable in the U.S. to lower transaction costs, the invention applies with equal force to financial instruments held in bearer form.

FIG. 8 is a diagram of the modeling interface of the modeler 34 that may be displayed on a issuer user interface 36 of the issuer terminal 12. The modeling interface has fields for entry or selection of an issuer identifier 120, a brand identifier 122, and a view identifier 124. The issuer identifier 120 allows the financial instruments or proposed financial instruments of one issuer to be distinguished from another. For example, Bank of America is the issuer shown in FIG. 8. The brand identifier 122 identifies the type of financial instrument of the issuer. The brand identifier 122 may be standardized across a group of issuers to promote uniformity and familiarity of the terms of the offered financial instruments among the broker-dealers. Here in FIG. 8, the brand identifier is Internotes, which may define the financial parameters of a debt security.

The view identifier 124 may include an assortment of viewable states of a display of a issuer user interface 36.

In one embodiment, the viewable states reflect the status of a financial instrument (e.g., a proposed security) subject to a proposed or an actual offering. For example, the view identifier 124 may indicate the status of the financial instrument as modeled, posted, offered, or issued. Modeled means that the terms of the financial instrument are being developed by the issuer, without the participation of the underwriter. Posted means that the terms of the securities are posted in a posting document so as to be electronically accessible to both the issuer and the underwriter. In the posted state, the underwriter can propose modifications to the terms or accept them as is. Issued means that the securities were offered and sold in accordance with the specified terms.

As shown in FIG. 8, the issuer identifier 120, the brand identifier 122, and the view identifier 124 are indicated in boxes. The boxes may be associated with a pull-down menu to facilitate selection of a preferential issue identifier from a list of issuer identifiers, a preferential brand identifier from a list of brand identifiers, and view identifier from a list of view identifiers.

The financial parameters of the financial instruments are expressed in a non-callable section 126 and a callable section 128 of financial instruments. A call represents a preemption of the natural maturity of a financial Instrument. Within the non-callable section 126 or the callable section 128, each financial instrument is defined by financial parameters set forth in corresponding rows. Each row represents a different financial instrument (e.g., a different security) with distinct financial parameters or characteristics. Although the first four rows relate to non-callable securities and the last two rows relate to callable securities as shown in FIG. 8, in practice any scheme of non-callable securities, callable securities, or both may fall within the scope of the invention The issuer may use the target columns (140, 142) of the modeling interface to model and establish appropriate financial parameters for issuance of the proposed financial instruments. The issuer may enter target values in the target spread to treasury column 140 and the target coupon column 142 via the issuer user interface 36. In the context of the callable financial instruments in the callable section 128, the target characteristics further include a target floating rate 153, a target floating rate date 154, and an adjusted target floating rate 156. The issuer may enter the target floating rate 153, the target floating rate date, and the adjusted target floating rate via the issuer user interface 36.

The modeler 34 preferably freezes the target data in at least part of the spread to treasury column 140 and the target coupon column 142, once the issuer posts the information for the particular financial instrument in an electronic format (e.g., a posting document) accessible to the underwriter, In contrast, the actual characteristics of the proposed securities are based on current market conditions and the target data.

The financial parameters of the financial instruments may be defined by a financial instrument identifier column 130, a creator-identifier column 132, a payment frequency column 134, a maturity column 136, a purchase price column 138, an actual spread-to-treasury column 146, a coupon-rate column 148, a benchmark yield (BEY) column 150, and a floating rate equivalent column 152. The creator-identifier may refer to the business entity (e.g., issuer), which establishes the financial parameters associated with the corresponding financial instrument. The payment frequency refers to the duration between payments of interest to the holder of the financial instrument. The maturity is the duration between issuance of the financial instrument and the return of par value or principal to the holder. The purchase price in the purchase price column 138 may refer to the wholesale price at which the underwriter purchases the security from the issuer. The actual spread to Treasury refers to the difference between the yield to the maturity for the particular financial instrument and the Treasury yield under prevailing market conditions. The actual spread to Treasury may be expressed in basis points. The coupon rate refers to the interest paid per year. With regards to the callable financial instruments, the actual characteristic of the callable securities includes a time-to-call column 158 (e.g., years to call).

The foregoing actual financial parameters are calculated fields. The modeler 34 recalculates the actual financial parameters when a user clicks a recalculate button 160 of the issuer user interface 36. The updated values for the actual financial parameters reflect any changes in the target spread to treasury column 140, the target coupon rate column 142, or the benchmark treasury rate. The actual financial parameter columns, except for the actual coupon rate column 148, reflect changes in the treasury rates throughout the lifecycle of the financial instruments in response to the market, whereas the target values may be frozen in the target columns (140, 142).

The floating rate equivalent in the floating rate equivalent column 152 is a calculated field. The floating rate equivalent is recalculated when a user clicks recalculate or hits the refresh button of the issuer user interface 36. The updated value of the floating rate equivalent column reflects changes in swap information and in the benchmark yield. The values in floating rate equivalent are preferably expressed in basis points, where 100 basis points equals one percent). Each value in the target floating rate date column 154 represent the last time that the target floating rate for a particular financial instrument was updated. The target floating rate in the target floating rate column 153 is a static field. The target floating rate displays the value that was inputted (e.g., inputted incident to swap information input). The adjusted target floating rate in the adjusted target floating rate column 156 is a calculated field. Each value of the adjusted target floating rate column 156 refers to the total change in basis points of the coupon and treasury rate of corresponding particular financial instrument. Because the target coupon rate 142 will not change after posting, the adjusted target floating rate column 156 primarily reflects a change in Treasury interest rates with market conditions.

Figure 9:
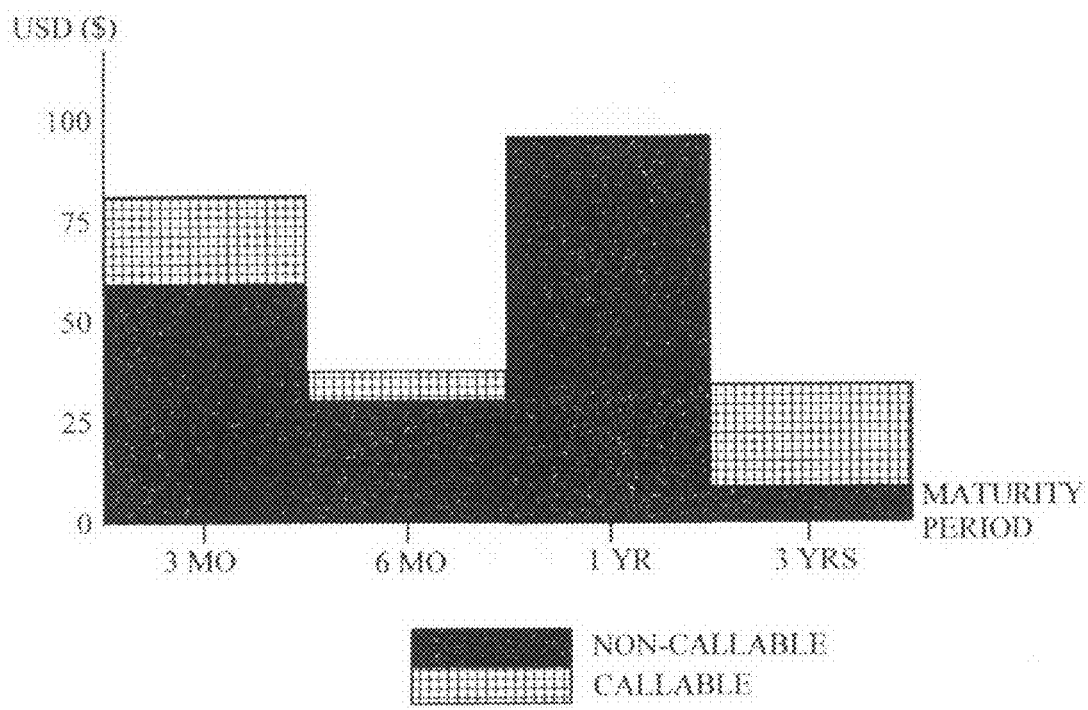
FIG. 9 is a bar graph that indicates sales versus maturity of an assortment of financial instruments in accordance with the invention.

FIG. 9 is a bar graph that indicates sales versus maturity of an assortment of financial instruments, which may be offered pursuant to the distribution system 10 of FIG. 1 and FIG. 2. The bar graph of FIG. 9 may be resident in the database 44 in a graphical form or as a look-up table that contains sales values versus maturity periods. The modeling support module 38 may send the bar or a look-up table, to the modeler 34 via the communications network 14. The vertical axis of FIG. 9 indicates sales in a selected currency (e.g., U.S. dollars). The horizontal axis indicates the respective maturities of different financial instruments, which may be associated with a single issuer. The callable financial instruments are indicated by the rectangular screen cross-hatch pattern, whereas the non-callable financial instruments are indicated by the solid pattern. The total in sales for a financial instrument of a given maturity is equal to the sales of the callable financial instrument plus the sales of the noncallable financial instrument.

In one example, the sales on the vertical axis of FIG. 9 may refer to historic sales or previous sales of previous financial instruments of an issuer (e.g., a previous issuer) in a prior primary offering. Accordingly, the chart of FIG. 9 may represent one form of marketing data that may be used to determine initial financial parameter data, final financial parameter data, or both. The initial financial parameter data and final financial parameter data may be tailored to address a preferential allocation of maturities and callable versus noncallable features for a related group or series of financial instruments (e.g., a brand of a single issuer). For example, based on the sales pattern in FIG. 9, the issuer may assign initial parameter data that favors a non-callable financial instrument with a one-year maturity over non-callable financial instruments with three year or six month maturities. That is, the issuer may decide to offer a greater quantity of one-year maturity securities than other maturities in a proposed offering, or not to offer securities with a three year maturity in the offering. In other embodiments, proposed financial instruments may track the financial parameters (e.g., preferential maturity or preferential non-callable status) of previous financial instruments based on relative previous sales of the previous financial instruments.

The data processing system 18 provides the issuer with on-line electronic tools, such as a legal compliance tool and a securities modeling tool to garner the issuer's interest in conducting a primary offering with employment of electronic communications and the exchange of electronic documents and data messages. In accordance with the invention, the method and system for enhanced distribution of securities, supports an issuer's issuance of securities (e.g., debt securities) in an expeditious manner that follows market conditions, market trends, or tracked marketing information. For example, the method and system of the invention supports the tracking of marketing information during a prior distribution phase, which can assist in the subsequent issuance and subsequent distribution of securities in a manner that are potentially more consistent with prevailing market conditions than would otherwise be possible. The broker-dealers or members of the selling group may market and sell the securities to retail customers, institutional investors, sophisticated investors, other broker-dealers, or other purchasers. In sum, the distribution system and method of the invention provides a comprehensive distribution scheme for financial instruments in an initial offering, where the issuer, the underwriter, one or more broker-dealers, a security regulator, market data provider, and retail investors can interact efficiently via electronic data messages over a communications network to selectively exchange and share information pertinent to the issuance and distribution of financial instruments. The comprehensive distribution scheme is well-suited for reducing the transactional costs of distributing securities in a timely manner that efficiently uses the limited human resources of one or more of the following: the issuer, the underwriter, the broker dealers of the selling group, and the security regulator.

In accordance with the invention, a distribution system and method supports increased automation in the issuance and distribution of a primary offering of financial instruments by using electronic communications. The electronic communications promote timely, accurate and convenient transmission of regulatory filings with a securities regulator, such as the Securities and Exchange Commission. The method and system supports collaboration between the issuer and the underwriter to achieve rapid and efficient agreement on the terms of the underwriting agreement and the underlying financial instruments that are the subject of the primary offering. Further, the method and system supports the provision of market-based information from the underwriter to the issuer or from market data sources (e.g., feed of a rate index) to facilitate distribution of the securities or financial instruments in accordance with terms that are appropriately matched to underlying market conditions.

The foregoing detailed description is merely illustrative of several physical embodiments of the system and method of the invention. Physical variations of the invention, not fully described in the specification, are encompassed within the purview of the claims. Accordingly, any narrow description of the elements in the specification should be used for general guidance rather than to unduly restrict the broader descriptions of the elements in the following claims.

The following is claimed:

1. A method for distributing a financial instrument in a primary offering, the method comprising:
   at a data processing system, receiving marketing data on at least one previous transaction of a previous financial instrument similar to a proposed financial instrument;
   at the data processing system, receiving market data relevant to the proposed financial instrument;
   at the data processing system, modeling initial financial parameter data associated with a corresponding proposed financial instrument based on at least the received market data relevant to the financial instrument and marketing data on the at least one previous transaction of said previous financial instrument similar to the proposed financial instrument having the initial parameter data;
   at the data processing system, receiving the initial financial parameter data from an issuer via a communications network, the initial financial parameter data relating to a proposed offering of the financial instrument;
   at the data processing system, determining final financial parameter data based on the initial parameter data and an agreement between the issuer and an underwriter;
   at the data processing system, generating data defining a regulatory filing on the offering, the regulatory filing consistent with the final financial parameter data, the regulatory filing including data for submission to a securities regulation system via the communications network.

2. The method according to claim 1 wherein the modeling comprises, at the data processing system, modeling the initial financial parameter data based on the market data and a target characteristic of the financial instrument.

3. The method according to claim 2 wherein the target characteristic comprises a target spread to treasury and a target coupon rate of the financial instrument.

4. The method according to claim 1 wherein receiving the marketing data includes receiving at the data processing system data about at least one of the following:
   whether the previous financial instrument of the previous transaction was callable or noncallable;
   a term to maturity of the previous financial instrument;
   a coupon frequency of the previous financial instrument,
   a purchase price of the previous financial instrument,
   a volume purchased of the previous financial instrument,
   a selling group identifier of selling broker-dealers participating in the transaction of the previous financial instrument,
   a yield or interest rate of the previous financial instrument,
   a date of the previous transaction, and
   a prevailing index interest rate as of the time of the transaction.

5. The method according to claim 1 further comprising:
   at the data processing system, gathering marketing data on at least one previous securities transaction having characteristics similar to those of a primary offering pursuant to the initial parameter data.

6. The method according to claim 1 wherein determining the final financial parameter data includes determining at the data processing system at least one of the following:
   whether the financial instrument is callable or noncallable;
   a term to maturity of the financial instrument;
   a coupon frequency of the financial instrument,
   a purchase price of the financial instrument,
   a total quantity offered of the financial instrument,
   a selling group identifier of selling broker-dealers participating in the transaction of the financial instrument, and
   a yield or interest rate of the financial instrument.

7. The method according to claim 1 further comprising:
   at the data processing system, receiving regularly updated market data as the market data relevant to the proposed financial instrument.

8. The method according to claim 1 further comprising receiving Treasury bill rate data as the market data on a delayed or live basis to facilitate accurate pricing of the offering of the financial instrument to actual market conditions.

9. The method according to claim 1 wherein receiving the initial financial parameter data comprises communicating data defining a posting document including the initial financial parameter data of the proposed offering on an electronic bulletin board as a proposal accessible to the issuer and the underwriter.

10. The method according to claim 9 wherein the underwriter originates the posting of the posting document in an electronic format accessible via the communications network.

11. The method according to claim 9 wherein the issuer originates the posting of the posting document in an electronic format accessible via the communications network.

12. The method according to claim 1 further comprising:
   at the data processing system, providing the generated data defining the regulatory filing to the issuer for review by the issuer; and
   transmitting data for the reviewed regulatory filing to a securities regulation system if the reviewed regulatory filing is acceptable to the issuer.

13. The method according to claim 1 comprising, at the data processing system, aggregating indications of interests from multiple broker-dealers during an indication phase prior to an execution phase for engaging in a transaction for the sale of the proposed financial instrument.

14. The method according to claim 13 wherein the indication phase has an aggregation time period of less than seven business days.

15. The method according to claim 13 wherein the execution phase has an execution time period of less than one day.

16. The method according to claim 1 further comprising:
   at the data processing system, storing the final financial parameters in a database;
   at the data processing system, storing data related to the regulatory filing in the database; and
   at the data processing system, storing marketing data on historical transactions of prior financial instruments of similar character to the proposed financial instrument.

17. The method according to claim 1 further comprising:
   at the data processing system, engaging in a transaction for the sale of the financial instrument to a purchaser via the communications network.

18. A method for distributing a financial instrument in a primary offering, the method comprising:
   at an underwriter data processing system, reviewing a posting document associated with a proposed financial instrument, the posting document containing initial financial parameter data, the initial financial parameter data having characteristics similar to received market-based data including marketing data on at least one previous securities transaction, the market-based data being relevant to a proposed financial instrument, the market-based data comprising marketing data on a previous transaction of a previous financial instrument, related to the proposed financial instrument, the posting document being received and being accessible via a communications network, the initial financial parameter data relating to a preliminary definition of the financial instrument;

at the underwriter data processing system, establishing final financial parameter data for a final definition of the financial instrument to replace the initial parameter data based on the reviewed posting document and the received market-based data;

at the underwriter data processing system, generating a regulatory filing on a primary offering of the proposed financial instrument; and transmitting the generated regulatory filing from the underwriter data processing system to an issuer terminal for an issuer's approval of the generated regulatory filing.

19. The method according to claim 18 further comprising, storing the posting document in the underwriter data processing system, the underwriter data processing system assigning a log-in identifier and a password to grant access of said issuer to the posting document via the communications network.

20. The method according to claim 18 further comprising storing the posting document in said issuer terminal of the issuer, the issuer terminal assigning a log-in identifier and a password to grant access of an underwriter to the posting document via the communications network.

21. The method according to claim 18 further comprising at the underwriter data processing system, filtering the transmission of a request for indications of interest on the proposed financial instrument to broker dealer terminals based on the filtering preferences or filtering rules provided by broker dealers.

22. The method according to claim 18 further comprising at the underwriter data processing system, filtering the transmission of an offering document on the proposed financial instrument to broker-dealer terminals based on the filtering preferences or filtering rules provided by broker dealers.

23. The method according to claim 18 further comprising at the underwriter data processing system, transmitting a request for an indication of interest reply to a broker-dealer terminal on the proposed financial instrument if the final financial parameter data and an affiliated issuer identity are consistent with a credit rating of an issuer meeting or exceeding a minimum threshold credit rating, assigned to the broker-dealer terminal in accordance with a preference of a broker-dealer.

24. The method according to claim 18 further comprising at the underwriter data processing system, transmitting an offering document to a broker-dealer terminal on the proposed financial instrument if the final financial parameter data and an affiliated issuer identity are consistent with a credit rating of an issuer meeting or exceeding a minimum threshold credit rating, assigned to the broker-dealer terminal in accordance with a preference of the broker-dealer.

25. The method according to claim 18 wherein establishing the final parameter data is based on market data and the marketing data, as the market-based data, on at least one previous transaction of a previous financial instrument similar to the proposed financial instrument having the initial parameter data.

26. The method according to claim 25 wherein the marketing data includes at least one of the following:
whether the previous financial instrument of the previous transaction was callable or noncallable;
a term to maturity of the previous financial instrument;
a coupon frequency of the previous financial instrument,
a purchase price of the previous financial instrument,
a volume purchased of the previous financial instrument,
a selling group identifier of selling broker-dealers participating in the transaction of the previous financial instrument,
a yield or interest rate of the previous financial instrument,
a date of the transaction, and
a prevailing index interest rate as of the time of the transaction.

27. The method according to claim 18 wherein the final financial parameter data includes at least one of the following:
whether the financial instrument is callable or noncallable;
a term to maturity of the financial instrument;
a coupon frequency of the financial instrument,
a purchase price of the financial instrument,
a total quantity offered of the financial instrument,
a selling group identifier of selling broker-dealers participating in the transaction of the financial instrument, and
a yield or interest rate of the financial instrument.

28. The method according to claim 18 further comprising receiving at the underwriter data processing system regularly updated market data as the market-based data associated with the proposed financial instrument.

29. The method according to claim 18 further comprising receiving at the underwriter data processing system Treasury bill rate data as the market-based data on a delayed or live basis to facilitate accurate pricing of the offering of the financial instrument to actual market conditions.

30. The method according to claim 18 further comprising at one of the issuer terminal and the underwriter data processing system, posting of the posting document in an electronic format accessible to both an issuer and an underwriter via the communications network.

31. The method according to claim 18 further comprising:
at the underwriter data processing system, upon the issuer's approval of the generated regulatory filing, transmitting the approved generated regulatory filing to a securities regulation system via the communications network.

32. The method according to claim 18 comprising
at the underwriter data processing system, aggregating indications of interests from multiple broker-dealers during an indication phase prior to an execution phase for engaging in a transaction for the sale of the proposed financial instrument.

33. The method according to claim 32 wherein the indication phase has an aggregation time period of less than seven business days.

34. The method according to claim 32 wherein the execution phase has an execution time period of less than one day.

35. The method according to claim 18 further comprising:
at the underwriter data processing system, storing the final financial parameter data in a database;
at the underwriter data processing system, storing data related to a regulatory filing in the database; and
at the underwriter data processing system, storing marketing data on historical transactions of prior financial instruments of similar character to the proposed financial instrument.

36. The method according to claim 18 further comprising:
at the underwriter data processing system, generating a regulatory filing on the offering for submission to a securities regulation system via the communications network, the regulatory filing consistent with the final financial parameter data.

37. The method according to claim 18 further comprising:
at the underwriter data processing system, engaging in a transaction for the sale of the financial instrument to a purchaser via the communications network.

* * * * *